United States Patent
Ebihara

(10) Patent No.: US 8,810,704 B2
(45) Date of Patent: *Aug. 19, 2014

(54) SOLID STATE IMAGE CAPTURE DEVICE AND CAMERA SYSTEM

(75) Inventor: Hiroaki Ebihara, Kanagawa (JP)

(73) Assignee: Sony Corporation, Tokyo (JP)

(*) Notice: Subject to any disclaimer, the term of this patent is extended or adjusted under 35 U.S.C. 154(b) by 87 days.

This patent is subject to a terminal disclaimer.

(21) Appl. No.: 13/447,812

(22) Filed: Apr. 16, 2012

(65) Prior Publication Data

US 2012/0194723 A1 Aug. 2, 2012

Related U.S. Application Data

(63) Continuation of application No. 12/478,040, filed on Jun. 4, 2009, now Pat. No. 8,174,598.

(30) Foreign Application Priority Data

Jun. 6, 2008 (JP) .................................. 2008-148743

(51) Int. Cl.
*H04N 3/14* (2006.01)
*H04N 5/335* (2011.01)

(52) U.S. Cl.
USPC ....................................................... 348/308

(58) Field of Classification Search
USPC ...................................... 348/222.1, 241, 308
See application file for complete search history.

(56) References Cited

U.S. PATENT DOCUMENTS

| 6,714,239 | B2 | 3/2004 | Guidash |
| 7,720,309 | B2 | 5/2010 | Sasaki et al. |
| 2004/0141077 | A1* | 7/2004 | Ohkawa .................. 348/308 |
| 2006/0284054 | A1* | 12/2006 | Asaba .................. 250/214.1 |
| 2007/0080376 | A1* | 4/2007 | Adachi et al. .............. 257/239 |
| 2007/0152133 | A1 | 7/2007 | He et al. |
| 2008/0002043 | A1 | 1/2008 | Inoue et al. |
| 2008/0239108 | A1* | 10/2008 | Kume .................. 348/241 |
| 2009/0072120 | A1 | 3/2009 | McGarry et al. |
| 2009/0167911 | A1 | 7/2009 | Takane |
| 2011/0149104 | A1* | 6/2011 | Mabuchi .................. 348/222.1 |

FOREIGN PATENT DOCUMENTS

| JP | 11-224941 | 8/1999 |
| JP | 2008-011298 | 1/2008 |

* cited by examiner

*Primary Examiner* — Gevell Selby
(74) *Attorney, Agent, or Firm* — Dentons US LLP

(57) ABSTRACT

A solid-state image capture device includes: a pixel section in which pixels are arranged in a matrix; control lines; a pixel drive section that performs control, through the control lines, an operation of the pixels so as to perform a shutter operation of the pixel section and so as to perform reading; a reading circuit that reads signals from the pixels; and a shutter-mode switching section that controls an operation of the pixel drive section in accordance with a rolling shutter system in which exposure is performed for each row or a global shutter system in which exposure is simultaneously performed on all the pixels. The pixel drive section includes a shutter-mode corresponding section that causes an impedance value from the control lines to a power supply in a global shutter operation to be greater than an impedance value in a rolling shutter operation.

14 Claims, 26 Drawing Sheets

IN ROLLING SHUTTER OPERATION
(WHEN TRG0 IS SELECTED)

IN ROLLING SHUTTER OPERATION
(WHEN TRG0 IS SELECTED)

IN ROLLING SHUTTER OPERATION
(WHEN ALL TRANSFER
SIGNALS TRG ARE SELECTED)

SOLID STATE IMAGE CAPTURE DEVICE AND CAMERA SYSTEM

RELATED APPLICATION DATA

This application is a continuation of U.S. application Ser. No. 12/478,040, filed Jun. 4, 2009, the entirety of which is incorporated herein by reference to the extent permitted by law. The present invention contains subject matter related to Japanese Patent Application JP 2008-148743 filed in the Japan Patent Office on Jun. 6, 2008, the entire contents of which are incorporated herein by reference to the extent permitted by law.

BACKGROUND OF THE INVENTION

1. Field of the Invention

The present invention relates to a solid-state image capture device typified by a CMOS image sensor and to a camera system.

2. Description of the Related Art

In recent years, CMOS (complementary metal oxide semiconductor) image sensors have been attracting attention as solid-state image capture devices (image sensors) that replace CCDs.

This is because the CMOS image sensors have overcome the following problems of CCDs.

For example, typically, manufacture of pixels of CCDs necessitates a dedicated process and operation thereof necessitates multiple power supply voltages and a combination of peripheral ICs (integrated circuits). In addition, in the case of the CCDs, the system becomes complicated.

For the CMOS image sensors, a manufacturing process that is similar to that for typical CMOS integrated circuits can be used. In addition, the CMOS image sensors can be driven by a single power supply, and further, analog circuits and logic circuits manufactured using a CMOS manufacturing process can be disposed in the same chip.

Thus, the CMOS image sensors have some significant advantages, such as being able to reduce the number of peripheral ICs.

An output circuit of a CCD mainly employs a single channel configuration using an FD amplifier having a floating diffusion (FD).

In contrast, the CMOS image sensor has FD amplifiers for the respective pixels, and mainly employs a column-parallel output configuration in which one row in the pixel array is selected and outputs from the selected row are simultaneously read in a column direction.

This is because, with the FD amplifiers arranged in the pixels, it is difficult to gain a sufficient drive capability, which may necessitate a reduction in data rate. Thus, parallel processing is considered to be advantageous.

Such CMOS image sensors are widely used as image-capture devices in image-capture apparatuses, such as digital cameras, camcorders, monitor cameras, and vehicle-mounted cameras.

FIG. 1 is a diagram showing a typical configuration example of a CMOS image sensor in which pixels are arranged in a two-dimensional array.

A CMOS image sensor 10 shown in FIG. 1 includes a pixel array section 11, a pixel drive circuit (a row selection circuit: Vdec) 12, and a reading circuit (a column processing circuit: AFE) 13.

The pixel array section 11 has pixel circuits arranged in a matrix having M rows×N columns.

The row selection circuit 12 controls an operation of pixels arranged in an arbitrary row in the pixel array section 11. The row selection circuit 12 controls the pixels through reset control lines LRST, transfer control lines LTRG, and selection control lines LSEL.

The reading circuit 13 receives data of a pixel row, subjected to reading control performed by the row selection circuit 12, through signal output lines LSGN and outputs the received data to a subsequent signal processing circuit.

The reading circuit 13 includes a correlated double sampling (CDS) circuit and an analog-to-digital converter (ADC).

FIG. 2 is a diagram showing an example of a CMOS-image-sensor pixel circuit having four transistors.

This pixel circuit 20 has a photoelectric conversion element (which may simply be referred to as a "PD" hereinafter) 21 implemented by, for example, a photodiode. In addition, the pixel circuit 20 has four transistors, namely, a transfer transistor 22, a reset transistor 23, an amplification transistor 24, and a selection transistor 25 as active elements with respect to the single photoelectric conversion element 21.

The photoelectric conversion element 21 converts incident light into charge (electrons in this case) having an amount corresponding to the amount of the incident light.

The transfer transistor 22 is connected between the photoelectric conversion element 21 and a floating diffusion (which may simply be referred to as an "FD" hereinafter), and has a gate (a transfer gate) to which a transfer signal (a drive signal) TRG is supplied through the transfer control line LTRG.

Thus, the electrons resulting from the photoelectric conversion performed by the photoelectric conversion element 21 are transferred to the floating diffusion FD.

The reset transistor 23 is connected between a power supply line LVREF and the floating diffusion FD, and has a gate to which a reset signal RST is supplied through the reset control line LRST.

Thus, the potential of the floating diffusion FD is reset to the potential of the power-supply line LVREF.

A gate of the amplification transistor 24 is connected to the floating diffusion FD. The amplification transistor 24 is connected to a signal line 26 (LSGN shown in FIG. 1) via the selection transistor 25 to constitute a source follower together with a constant current source other than for the pixel section.

An address signal (a selection signal) SEL is supplied to a gate of the selection transistor 25 through the selection control line LSEL to thereby turn on the selection transistor 25.

When the selection transistor 25 is turned on, the amplification transistor 24 amplifies the potential of the floating diffusion FD and outputs a voltage corresponding to the amplified potential to the signal line 26. The voltage output from each pixel through the signal line 26 is then output to the reading circuit 13.

In a pixel reset operation, the transfer transistor 22 is turned on to transfer charge, stored in the photoelectric conversion element 21, to the floating diffusion FD for discharge.

In this case, charge in the floating diffusion FD has been pre-discharged to the power-supply side through turning on of the reset transistor 23 so that the charge in the photoelectric conversion element 21 can be received by the floating diffusion FD. Alternatively, while the transfer transistor 22 is on, the reset transistor 23 may be turned on in conjunction therewith to discharge the charge directly to the power supply side.

The above-described series of operations will be simply referred to as a "pixel reset operation" or a "shutter operation".

On the other hand, in a reading operation, the reset transistor 23 is first turned on to reset the floating diffusion FD, and an output is output to the output signal line 26 through the selection transistors 25 turned on in the reset state. This output will be referred to as a P-phase output.

Next, the transfer transistor 22 is turned on to transfer charge, stored in the photoelectric conversion element 21, to the floating diffusion FD, and the resulting output is output to the output signal line 26. This output will be referred to as a D-phase output.

A circuit provided outside the pixel circuit determines a difference between the D-phase output and the P-phase output and cancels reset noise of the floating diffusion FD to provide an image signal.

The series of operations will simply be referred to as a "pixel reading operation".

The row selection circuit 12 selectively drives the transfer control lines LTRG, the reset control lines LRST, and the selection control lines LSEL.

For example, a three-transistor configuration (3Tr type) or a five-transistor configuration (5Tr type), other than the four-transistor configuration (4Tr type), may also be used as the pixel circuit configuration.

The 3Tr-type pixel circuit does not have a transfer transistor for controlling transfer of charge from the photoelectric conversion element (PD) 21 to the floating diffusion FD in accordance with the potential of the transfer control line LTRG.

When a CMOS image sensor using the 4Tr-type pixel circuit is used to capture an image, the operation of each pixel is controlled in order of "PD reset", "exposure", "FD reset and signal reading", and "PD-to-FD charge transfer and signal reading".

When a CMOS image sensor using the 3Tr-type pixel circuit is used to capture an image, the operation of each pixel is controlled in order of "PD/FD reset", "exposure", "signal reading", and "PD/FD reset and signal reading".

As an exposure system for CMOS image sensors, a rolling shutter system and a global shutter system are available.

In the rolling shutter system, the reset, exposure, and reading operations for the pixels arranged in the same row are performed at the same time.

Compared to the global shutter system, the rolling shutter system is widely used since it can be realized with a simple configuration and its operation is simple.

Also, in a period of time in which reading is performed on a particular row, exposure can be simultaneously performed on another row. Thus, the rolling shutter system also has an advantage in that the frame rate can be easily increased.

However, since timings for performing image capture are different from each other depending on the row, an image can be distorted when a subject or a camera is in motion. In particular, when the rolling shutter system is used for high-resolution photography, a difference in the image-capture timing becomes large depending on the row and thus the amount of distortion can also be more likely to increase.

In contrast, in the global shutter system, the reset and exposure are simultaneously performed on all pixels. Thus, no image distortion occurs between the rows. However, compared to a case in which only the rolling shutter system is used, the configuration of the image-capture apparatus or the CMOS image sensor tends to become complicated.

For example, Japanese Unexamined Patent Application Publication No. 2008-11298 discloses a system for performing a global shutter operation by combining a liquid-crystal shutter with a CMOS image sensor using a typical pixel circuit as shown in FIG. 2.

In the disclosed configuration, the PDs of all pixels are reset while the liquid-crystal shutter is open, exposure is performed, and then the liquid-crystal shutter is closed. With this arrangement, the PD reset and the exposure are simultaneously performed on all pixels. Reading is sequentially performed for each row, as in the reading in the rolling shutter operation.

Providing an image-capture apparatus with a mechanical shutter or a flash, instead of the liquid-crystal shutter, can similarly achieve the global shutter system.

Such an approach involves independently performing exposure and reading, and thus the frame rate decreases.

Even for an image capture apparatus using the global shutter system, the rolling shutter system is often used for capturing relatively low-quality images intended for, for example, previewing on the image capture apparatus. The rolling shutter system is also advantageous in order to increase the frame rate.

Thus, even for a CMOS image sensor using the global shutter system, it is desirable that the CMOS image sensor is also capable of performing operation in the rolling shutter system.

As described above, in the rolling shutter operation, the row selection circuit (Vdec) 12 selects the pixels for each row.

Thus, the period of time in which each row is selected is severely limited by a desired resolution and frame rate.

For example, when a user wishes to take an image with an 8 M pixel resolution (2500 rows×3200 columns) at 15 fps (frames/second), about 26 µs is taken for the operation for one row. In this period of time, operations including "reset of PDs in the shutter row", "reset of FDs in the row to be read and reading", and "PD-to-FD charge transfer and reading" are performed.

In this case, the period of time for the operations of the PD reset, the transfer, and the FD reset which involve control of the control lines is set to about 0.5 to a few microseconds. Thus, the row selection circuit typically necessitates a sufficient drive capability for performing switching to the potential of the control lines within the set time.

On the other hand, the global shutter system involves simultaneous exposure of all pixels.

When the global shutter system is realized in combination with the liquid-crystal shutter or mechanical shutter, the PDs of all pixels are reset while the shutter is open.

In the global shutter system, after a predetermined exposure time passes, the shutter is closed so that no light is incident on the PDs of the pixels. By doing so, exposure of all pixels is simultaneously performed.

In the global shutter system, since the PDs of all pixels are simultaneously performed, all reset signals RST are switched at the same time.

Reading in the global shutter system is analogous to that in the rolling shutter system.

Next, a description will be given of an exposure system for a CMOS image sensor for obtaining a color image.

For a CMOS image sensor for obtaining a color image, there is a system in which a color filter array is provided on the pixel array to permit only light having a spectrum in a specific range to pass for each pixel.

An available example of the arrangement of the color filter array is a Bayer arrangement that is constituted by red (R), blue (B), and green (G) filters.

When light is made incident on the pixels through the color filters, the sensitivity of the photoelectric conversion elements (PDs) varies depending on a light spectrum, i.e., color. For example, when white light having the same amount of photon distribution in all spectra is made incident on the pixels, the number of electrons generated by the PDs varies depending on the color of the color filter through which the light passes.

Thus, when the storage times of all pixels are the same, signal processing is performed on signals output from the solid-state image capture device and an appropriate gain is applied to each color to obtain an appropriate color balance.

However, since the gain is applied, there is a problem in that noise is also amplified. Accordingly, Japanese Unexamined Patent Application Publication No. 11-224941 discloses a method for making the number of electrons generated by the PDs when white light is incident to be substantially equal even for pixels having different color filters. In this method, the exposure times are individually set for respective colors.

In such a case, in the rolling shutter system and in the global shutter system, the timings of the PD reset are controlled for the individual colors to vary the exposure times for the respective colors.

SUMMARY OF THE INVENTION

As described above, in the global shutter system, for example, for the 3Tr-type pixel circuit, the row selection circuit simultaneously switches the potentials of the reset signals RST for all pixels, and for the 4Tr-type pixel circuit or the like, the row selection circuit simultaneously switches the potentials of all reset signals RST and transfer signals TRG.

As a result, in the global shutter system, an excessive amount of instantaneous current flows, which poses a drawback in that measures against power-supply noise may be necessary.

Since the row selection circuit drives the control signals for the pixels, it is preferable that the power supply for the pixel selection signals have the same voltage as the power supply for the pixel array section.

In this case, noise generated by the row selection circuit affects the power supply for the pixel array section and also the signals output from the pixels. Thus, there is a drawback in that the quality of an image captured by the CMOS image sensor deteriorates.

There is also a drawback in that, when the power supply function is weak, an instantaneous-voltage change induced by the instantaneous current causes latchup and the solid-state image capture device is broken.

In the global shutter operation for each color, while pixels having large amounts of exposure time are being exposed, the global shutter operation for pixels for other color is performed.

This operation, however, has drawbacks. Specifically, when the power-supply potential for the row selection circuit is varied by the instantaneous current, the potential of the transfer signal TRG also fluctuates. This affects the number of electrons stored in the PDs to cause deterioration of the image quality.

For example, when the PDs of the green (G) pixels are reset after reset of the PDs of the red (R) and blue (B) pixels, the reset of the PDs of the green (G) pixels causes the power supply to fluctuate and thus the amounts of charge stored in the red and blue pixels vary.

When measures against the above-described problems are taken by simply reducing the drive capability of the row selection circuit to reduce the amount of instantaneous current, there is a drawback in that it is difficult to satisfy requirements for operation speeds for the operation in the rolling shutter system and in data-reading operation.

When the resolution and/or the frame rate are increased, a selection period for each row is reduced and thus it is necessary that the potentials of the control lines generally be switched at high speed.

Moreover, for high-resolution image capture, since the number of control lines is large, the use of the global shutter system also results in an increased amount of instantaneous current.

Thus, for CMOS image sensors having a larger number of pixels, the above-described problems become more prominent. In recent years, the number of pixels has been increasing even for CMOS image sensors for mobile equipment. However, with a solid-state image capture apparatus for such an application, it is difficult to enhance the power-supply function in terms of reductions in size, weight, and cost. Thus, the above-described problems are particularly likely to arise.

It is desirable to provide a solid-state image capture device and a camera system which are capable of reducing the amount of instantaneous current in the global shutter system without affecting the operation in the rolling shutter system and the reading operation.

According to a first embodiment of the present invention, there is provided a solid-state image capture device. The solid-state image capture device includes: a pixel section in which pixels are arranged in a matrix, each pixel converting an optical signal into an electrical signal and storing the electrical signal in accordance with exposure time; control lines through which the pixels are driven and controlled; a pixel drive section that performs control, through the control lines, an operation of the pixels so as to perform a shutter operation of the pixel section and so as to perform reading; a reading circuit that reads signals from the pixels; and a shutter-mode switching section that controls an operation of the pixel drive section in accordance with a rolling shutter system in which exposure is performed for each row or a global shutter system in which exposure is simultaneously performed on all the pixels. The pixel drive section selects at least one of the control lines when exposure is performed in the rolling shutter system and selects all of the control lines when exposure is performed in the global shutter system, and includes a shutter-mode corresponding section that causes an impedance value from the control lines to a power supply in a global shutter operation to be greater than an impedance value in a rolling shutter operation.

Preferably, the shutter-mode corresponding section includes an impedance element connected between a power-supply terminal of the pixel drive section and at least one of power-supply lines of a power-supply potential and a reference potential.

Preferably, the pixel-drive section has: a control-line selection circuit that selects at least one of rows of the control lines, a control signal being to be output to the pixels in the selected row; and a control-line selection driver section including drivers that amplify a signal from the control-line selection circuit and drive the control signal for the pixels to the corresponding control lines. The impedance element in the shutter-mode corresponding section may include a resistor having a resistance value RREG expressed by:

$$RREG = RDRIVE/X (20 \leq X \leq M/10)$$

where RDRIVE indicates an on-resistance of the drivers and M indicates the number of control lines.

Preferably, the pixel-drive section has: a control-line selection circuit that selects at least one of rows of the control lines, a control signal being to be output to the pixels in the selected row; and a control-line selection driver section including drivers that amplify a signal from the control-line selection circuit and that drive the control signal for the pixels to the corresponding control lines. The shutter-mode corresponding section may include an impedance element connected between a power-supply terminal of the control-line selection driver section and at least one of power-supply lines of a power-supply potential and a reference potential.

Preferably, the impedance element in the shutter-mode corresponding section includes a resistor having a resistance value RREG expressed by:

$$RREG=RDRIVE/X(20 \le X \le M/10)$$

where RDRIVE indicates an on-resistance of the drivers and M indicates the number of control lines.

Preferably, the pixel-drive section has: a control-line selection circuit that selects at least one of rows of the control lines, a control signal being to be output to the pixels in the selected row; and a control-line selection driver section including drivers that amplify a signal from the control-line selection circuit and that drive the control signal for the pixels to the corresponding control lines. The shutter-mode corresponding section may include a selection-range switching section that selects at least one of the drivers in the control-line selection driver section when exposure is performed in the rolling shutter system and selects all of the drivers in the control-line selection driver section when exposure is performed in the global shutter system.

Preferably, the drivers arranged in different ones of the ranges selected by the selection-range switching section share a part in the control-line selection driver section.

Preferably, when exposure is performed in the rolling shutter system, the pixel drive section selects, at different timings, the drivers arranged in different ones of the selection ranges selected by the selection-range switching circuit.

The pixel drive section has: a control-line selection circuit that selects at least one of rows of the control lines, a control signal being to be output to the pixels in the selected row; and a control-line selection driver section including drivers that amplify a signal from the control-line selection circuit and that drive the control signal for the pixels to the corresponding control lines. The shutter-mode corresponding section may include a drive-capability adjusting section that switches between a drive capability of the drivers when exposure is performed in the global shutter system and a drive capability of the drivers when exposure is performed in the rolling shutter system.

Preferably, the drive-capability adjusting section adjusts the drive capability of the drivers when exposure is performed in the global shutter system to be smaller than the drive capability of the drivers when exposure is performed in the rolling shutter system.

Preferably, the control-line selection driver section has driver buffers connected in parallel between a power-supply line and an output terminal connected to the control line; each driver buffer includes a drive-capability-adjustment transistor connected between the power-supply line and the output terminal; and the drive-capability adjusting circuit controls the number of operable driver buffers by controlling turning-on and turning-off of the drive-capability-adjustment transistors of the driver buffers.

Preferably, the control-line selection driver section has a driver buffer connected in parallel between a power supply line and an output terminal connected to the control line; the driver buffer includes a drive-capability-adjustment transistor connected between the power-supply line and the output terminal; and the drive-capability adjusting circuit controls current flowing through the driver buffer by changing a signal level of the control terminal of the drive-capability-adjustment transistor of the driver buffer.

Preferably, the pixel has: an output node; a photoelectric conversion element that converts the optical signal into the electrical signal and stores charge of the electrical signal; a transfer element that is turned on or turned off in accordance with a transfer signal and that transfers the charge in the photoelectric conversion element to the output node when the transfer signal is turned on; and a reset element that is turned on or turned off in accordance with a reset signal and that resets the output node when the reset element is turned on.

Preferably, the reading circuit reads pixel signals for multiple pixels from the pixel array section, and includes: comparators that are arranged so as to correspond to columns of the pixels and that perform determination by comparing potentials of the read pixel signals with a reference voltage and output signals of the determination; and counters that are controlled by the output signals of the determination to count comparison times of the corresponding comparators.

According to a second embodiment of the present invention, there is provided a camera system. The camera system includes: a solid-state image capture device; an optical system that forms an image on the solid-state image capture device; and a signal processing section that processes an image signal output from the solid-state image capture device. The solid-state image capture device includes: a pixel section in which pixels are arranged in a matrix, each pixel converting an optical signal into an electrical signal and storing the electrical signal in accordance with exposure time; control lines through which the pixels are driven and controlled; a pixel drive section that performs control, through the control lines, an operation of the pixels so as to perform a shutter operation of the pixel section and so as to perform reading; a reading circuit that reads signals from the pixels; and a shutter-mode switching section that controls an operation of the pixel drive section in accordance with a rolling shutter system in which exposure is performed for each row or a global shutter system in which exposure is simultaneously performed on all the pixels. The pixel drive section selects at least one of the control lines when exposure is performed in the rolling shutter system and selects all of the control lines when exposure is performed in the global shutter system, and includes a shutter-mode corresponding section that causes an impedance value from the control lines to a power supply in a global shutter operation to be greater than an impedance value in a rolling shutter operation.

According to the embodiment of the present invention, when exposure is performed in the global shutter system, all of the control lines are selected.

The shutter-mode corresponding section causes the value of impedance viewed from the control lines to the power supply in the global shutter operation to be larger than the value of impedance in the rolling shutter operation.

According to the present invention, it is possible to reduce the amount of instantaneous current in the global shutter system without affecting the operation in the rolling shutter system and the reading operation.

DESCRIPTION OF THE PREFERRED EMBODIMENTS

Embodiments of the present invention will be described below in connection with the accompanying drawings.

First Embodiment

Figure 1:
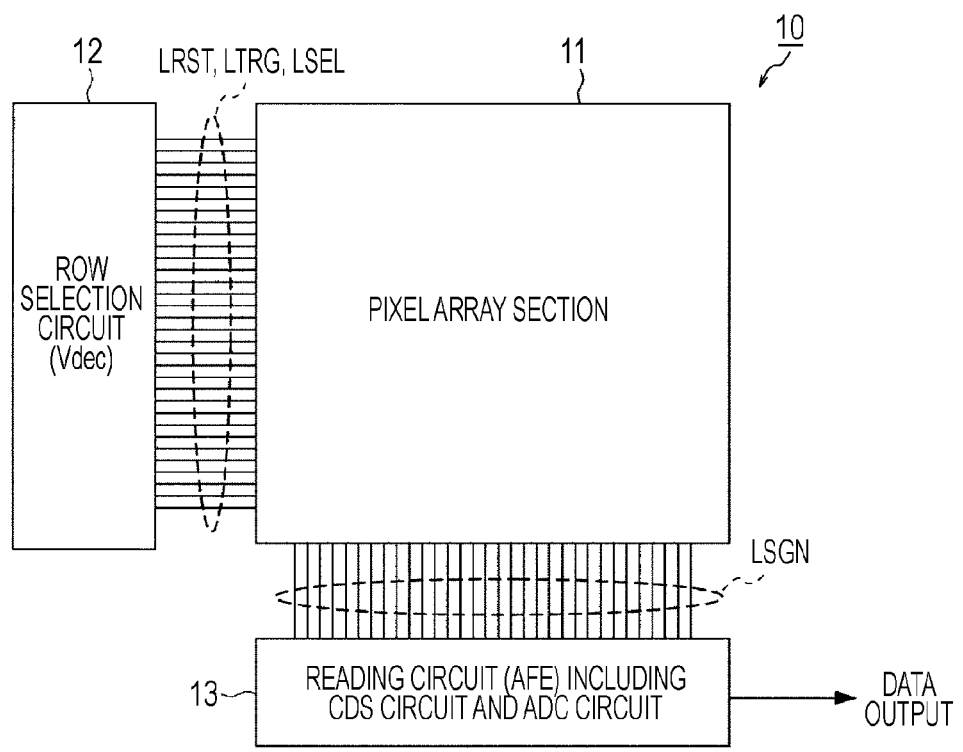
FIG. 1 is a diagram showing a typical configuration example of a CMOS image sensor (a solid-state image capture device) in which pixels are arranged in a two-dimensional array.
Figure 2:
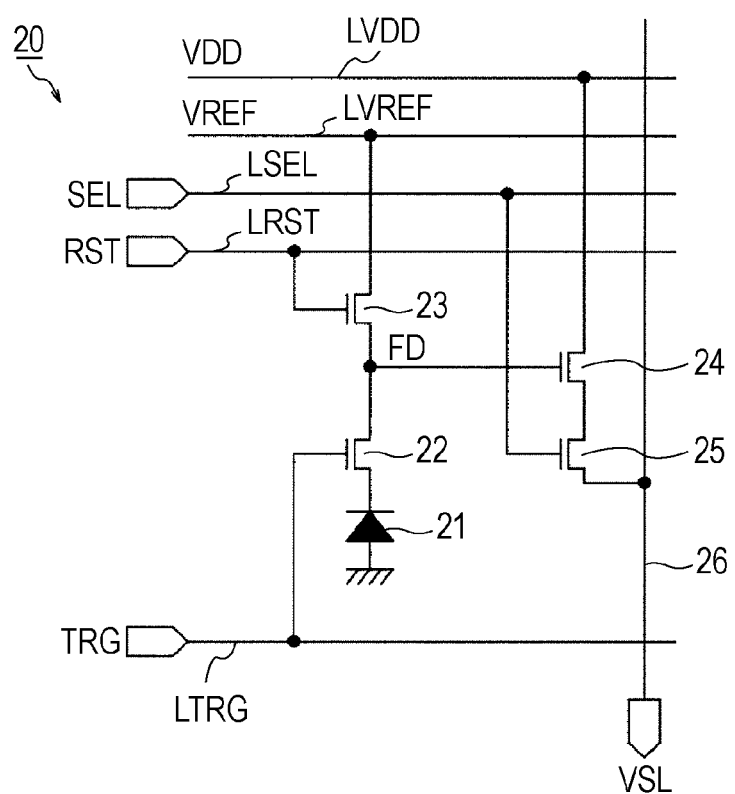
FIG. 2 is a diagram showing an example of a CMOS-image-sensor pixel having four transistors.
Figure 3:
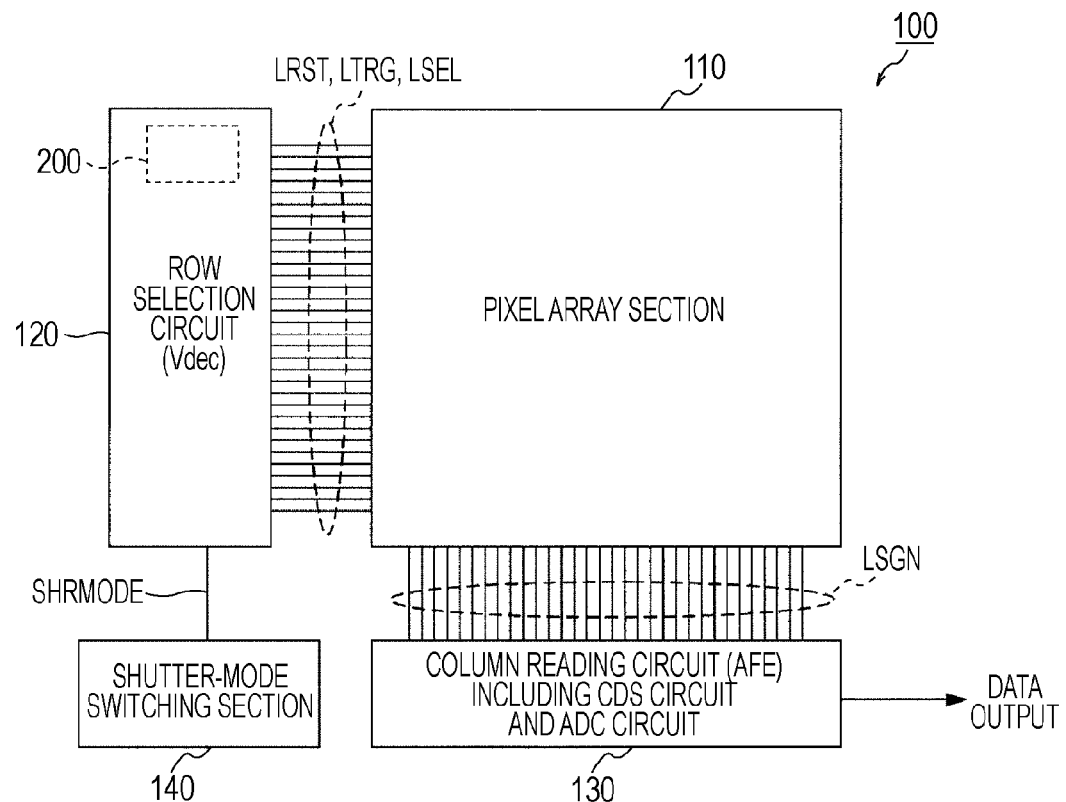
FIG. 3 is a diagram showing an example of the configuration of a CMOS image sensor (a solid-state image capture device) according to an embodiment of the present invention.

FIG. 3 is a diagram illustrating an example of the configuration of a CMOS image sensor (or a solid-state image capture device) according to an embodiment of the present invention.

A CMOS image sensor 100 includes a pixel array section 110, a row selection circuit (Vdec) 120 serving as a pixel drive section, a column reading circuit (AFE) 130, and a shutter-mode switching section 140.

The pixel array section 110 has multiple pixel circuits 110A arranged in a two-dimensional array (a matrix) having M rows×N columns.

Figure 4:
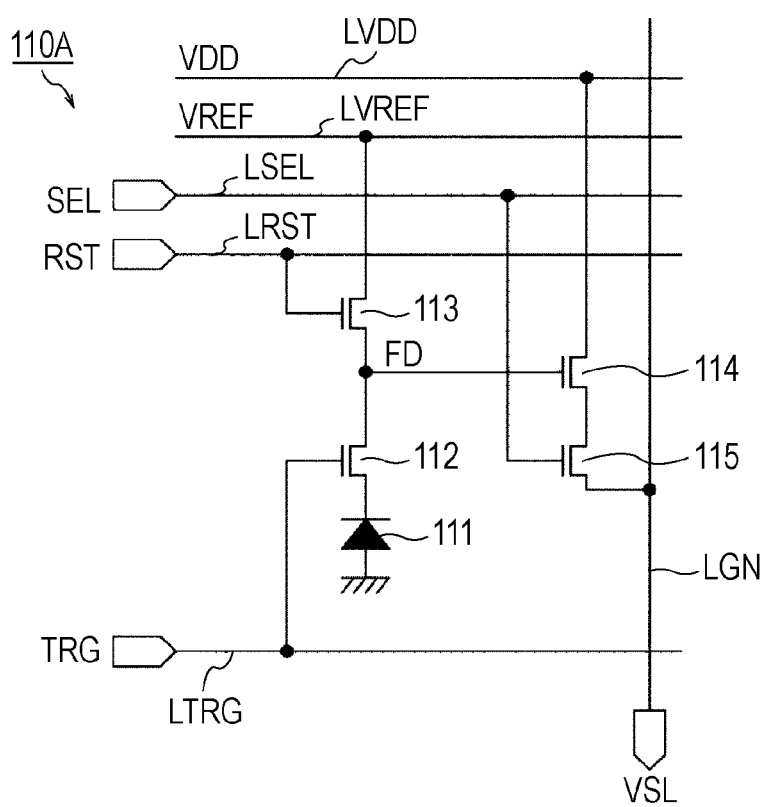
FIG. 4 is a diagram showing one example of a CMOS-image-sensor pixel having four transistors according to the embodiment of the present invention.

FIG. 4 is a diagram showing one example of a pixel in the CMOS image sensor, the pixel having four transistors according to the embodiment of the present invention.

Each pixel circuit 110A has a photoelectric conversion element (which may simply be referred to as a "PD" hereinafter) 111 implemented by, for example, a photodiode (PD).

The pixel circuit 110A has four transistors, namely, a transfer transistor 112, a reset transistor 113, an amplification transistor 114, and a selection transistor 115 as active elements with respect to the single photoelectric conversion element 111.

The photoelectric conversion element 111 converts incident light into charge (electrons in this case) having an amount corresponding to the amount of the incident light.

The transfer transistor 112 is connected between the photoelectric conversion element 111 and a floating diffusion (which may simply be referred to as an "FD" hereinafter) serving as an output node, and has a gate (transfer gate) to which a transfer signal TRG, which serves as a control signal, is supplied through a transfer control line LTRG.

With this arrangement, the transfer transistor 112 transfers the electrons, resulting from the photoelectric conversion performed by the photoelectric conversion element 111, to the floating diffusion FD.

The reset transistor 113 is connected between a power supply line LVREF and the floating diffusion FD, and has a gate to which a reset signal RST, which serves as a control signal, is supplied through a reset control line LRST.

With this arrangement, the reset transistor 113 resets the potential of the floating diffusion FD to the potential of the power supply line LVREF.

A gate of the amplification transistor 114 is connected to the floating diffusion FD. The amplification transistor 114 is connected to a signal line LSGN via the selection transistor 115 to constitute a source follower together with a constant current source other than for the pixel section.

A selection signal SEL, which serves as a control signal according to an address signal, is supplied to a gate of the selection transistor 115 through a selection control line LSEL to thereby turn on the selection transistor 115.

When the selection transistor 115 is turned on, the amplification transistor 114 amplifies the potential of the floating diffusion FD and outputs a voltage corresponding to the amplified potential to the signal line LSGN. The voltage output from each pixel through the signal line LSGN is output to the column reading circuit 130.

The above-described operations are simultaneously operated on the pixels for one row, since the gates of transfer transistors 112, the reset transistors 113, and the selection transistors 115 are connected for each row.

M reset control lines LRST, M transfer control lines LTRG, and M selection control lines LSEL are disposed in the pixel array section 110.

A set of the reset control line LRST, the transfer control line LTRG, and the selection control line LSEL is provided for each row in the pixel array section 110.

The row selection circuit 120 drives the reset control lines LRST, the transfer control lines LTRG, and the selection control lines LSEL.

The row selection circuit 120 controls an operation of the pixels arranged in an arbitrary row in the pixel array section 110. The row selection circuit 120 controls the pixels through the control lines LRST, LTRG, and LSEL.

In accordance with a shutter-mode switching signal SHR-MODE input from the shutter-mode switching section 140, the row selection circuit 120 switches a exposure system between a rolling shutter system and a global shutter system to perform image drive control. In the rolling shutter system, exposure is performed for each row, and in the global shutter system, exposure is simultaneously performed on all pixels.

For exposure in the rolling shutter system, the row selection circuit 120 selects and drives some of the 3M control lines (LRST, LTRG, and LSEL). For exposure in the global shutter system, the row selection circuit 120 selects and drives all M reset control lines LRST and all M transfer control lines LTRG.

Figure 5:
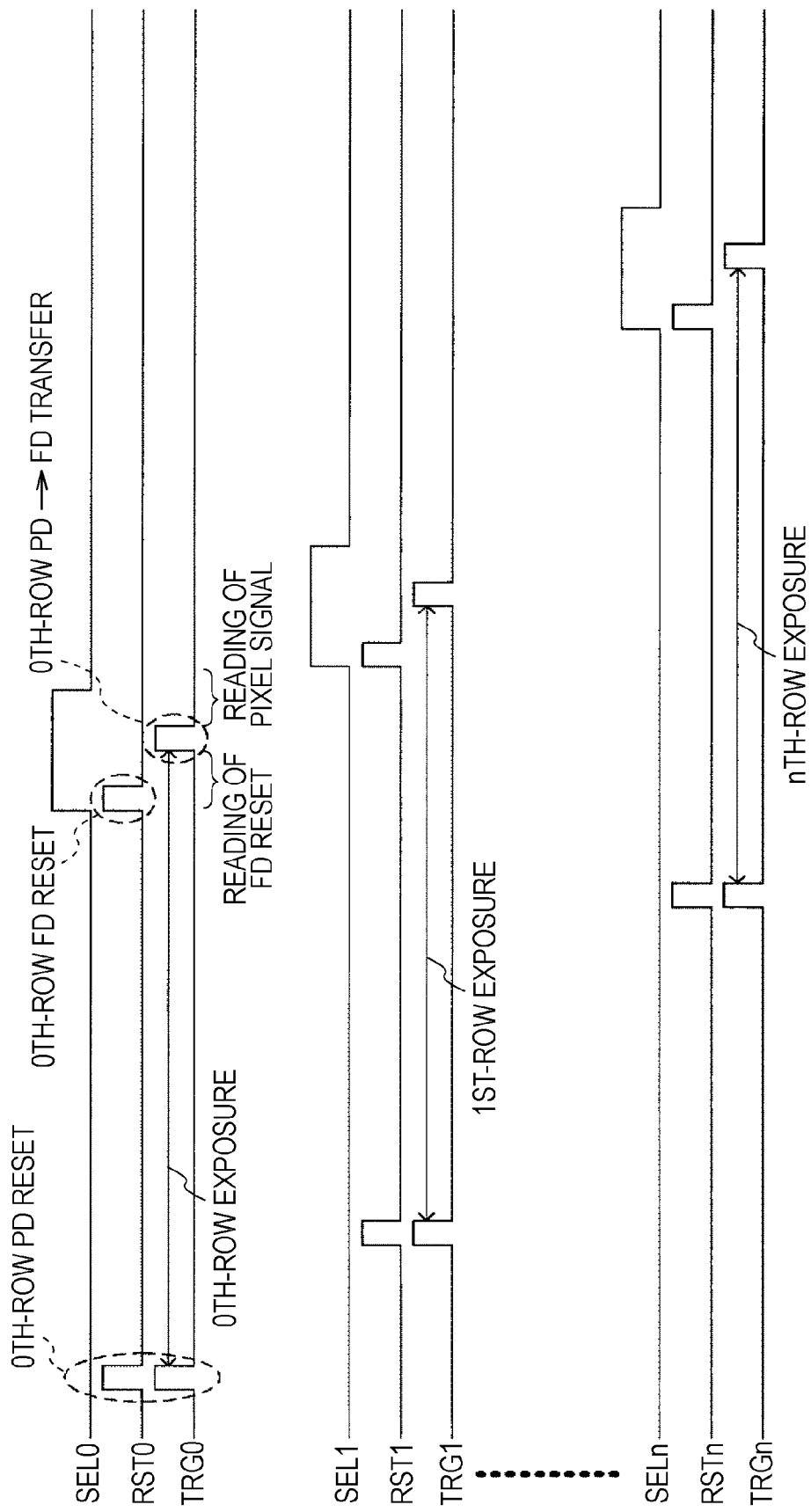
FIG. 5 is a timing chart showing an operation in a rolling shutter system for a CMOS image sensor employing the 4Tr-type pixel circuit shown in FIG. 4.

FIG. 5 is a timing chart showing an operation in the rolling shutter system for the CMOS image sensor employing the 4Tr-type pixel circuit shown in FIG. 4.

The 4Tr-type pixel circuit 110A controls an operation for each row in order of "PD reset", "exposure", "FD reset", "reading of FD reset", PD-to-FD charge transfer", and "pixel data reading".

In the 4Tr-type pixel circuit 110A, the PDs and the FDs are separated by the transfer transistors 112, as described above. Thus, for resetting the PDs, not only the reset transistors 113 but also the transfer transistors 112 are turned on.

Figure 6:
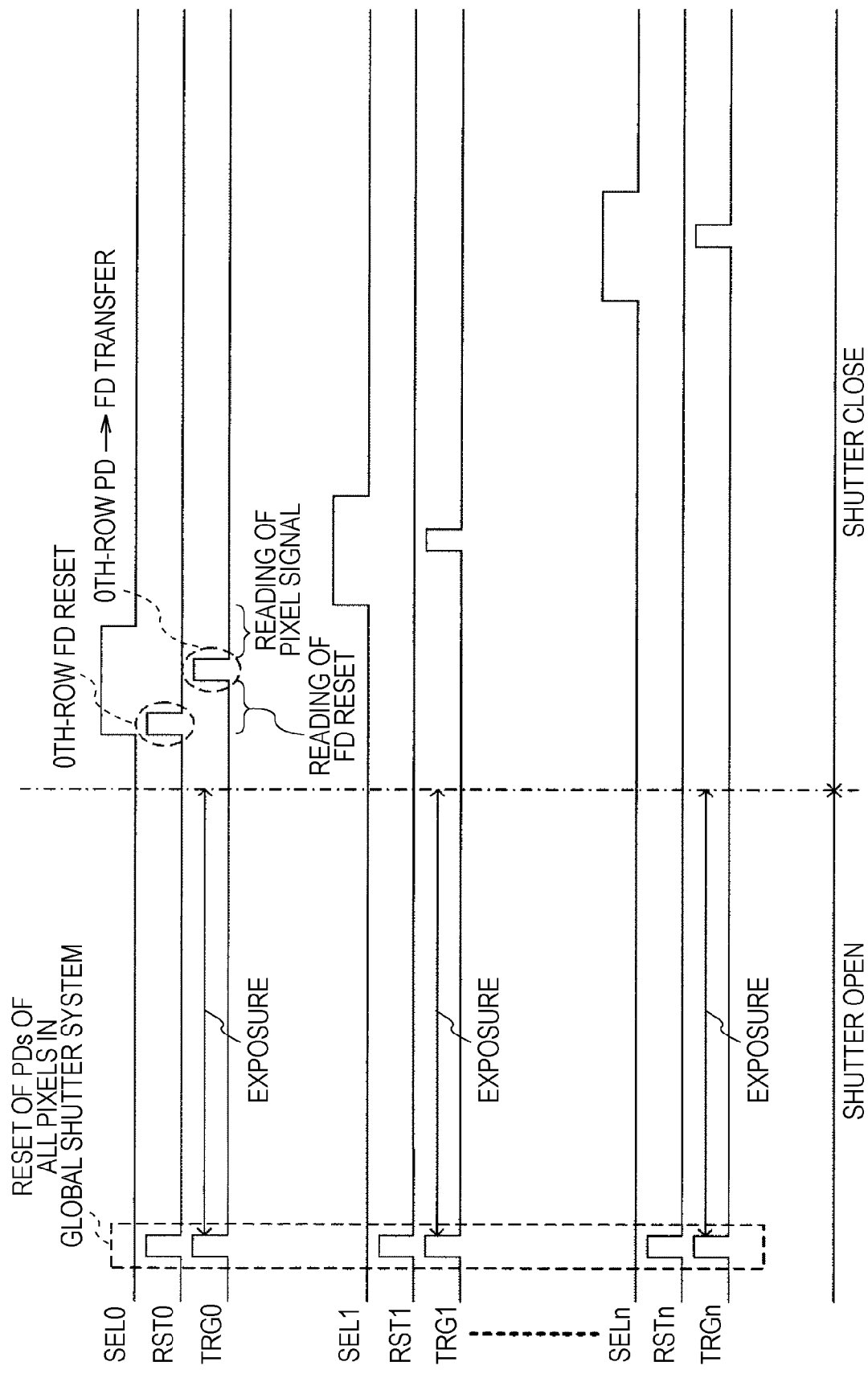
FIG. 6 is a timing chart showing an operation in a global shutter system when a CMOS image sensor employing the 4Tr-type pixel circuit and a liquid-crystal shutter or mechanical shutter are combined.

FIG. 6 is a timing chart showing an operation in the global shutter system when a CMOS image sensor employing the 4Tr-type pixel circuit and a liquid-crystal shutter or mechanical shutter are combined.

In this case, the PDs of all pixels are simultaneously reset while the shutter is open, and the shutter is closed to perform simultaneous exposure of all pixels.

For resetting the PDs in the 4Tr-type pixel circuits 110A, the reset signals RST and the transfer signals TRG are brought to high levels at the same time.

Thus, as shown in FIG. 6, during reset of the PDs of all pixels, all reset signals RST and all transfer signals TRG are switched at the same time.

Reading in the global shutter system is analogous to that in the rolling shutter system.

The row selection circuit 120 includes a shutter-mode corresponding section 200 for causing an impedance value (e.g., a resistance value or a reactance value) viewed from the control lines to the power supply in the global shutter operation to be greater than an impedance value in the rolling shutter operation.

The shutter-mode corresponding section 200 in the row selection circuit 120 can reduce the amount of instantaneous current in the global shutter system without affecting the operation in the rolling shutter system and the reading operation.

The configuration and the function of the row selection circuit 120 including the shutter-mode corresponding section 200 are described below in detail.

The column reading circuit 130 receives data in a pixel row, subjected to reading control performed by the row selection circuit 120, through the signal output lines LSGN and outputs the received data to a subsequent signal processing circuit.

The reading circuit 130 includes a correlated double sampling (CDS) circuit and an analog-to-digital converter (ADC).

The shutter-mode switching section 140 controls the row selection circuit 120 so as to perform pixel driving corresponding to either the rolling shutter system, in which exposure is performed for each row, or the global shutter system, in which exposure is simultaneously performed on all pixels.

The shutter-mode switching section 140 performs control to determine whether to perform pixel driving corresponding to the rolling shutter system or the global shutter system, by using the shutter-mode switching signal SHRMODE.

For issuing an instruction for driving corresponding to the rolling shutter system, the shutter-mode switching section 140 sets the shutter-mode switching signal SHRMODE to a low level and outputs the set shutter-mode switching signal SHRMODE to the row selection circuit 120.

For issuing an instruction for driving corresponding to the global shutter system, the shutter-mode switching section 140 sets the shutter-mode switching signal SHRMODE to a high level and outputs the set shutter-mode switching signal SHR-MODE to the row selection circuit 120.

A specific configuration and the function of a row decoder of the row selection circuit 120 according to the embodiment will now be described.

Figure 7:
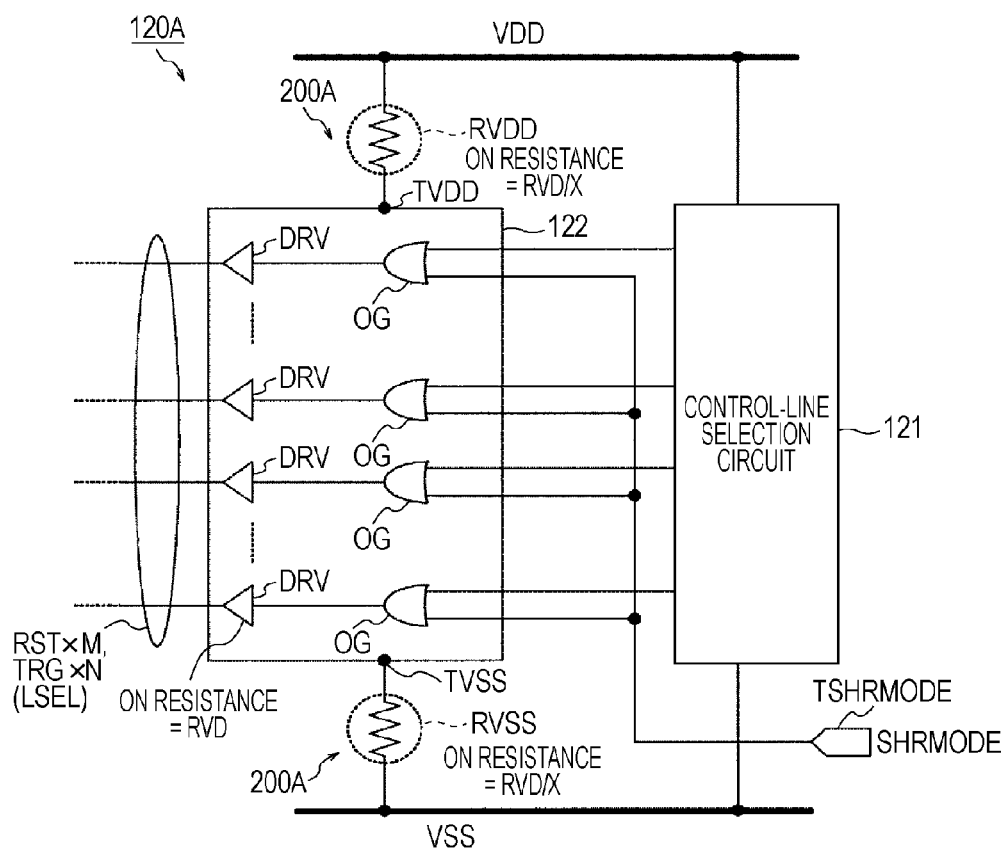
FIG. 7 is a circuit diagram showing an example of the configuration of a row selection circuit according to a first embodiment of the present invention.

FIG. 7 is a circuit diagram showing an example of the configuration of a row selection circuit according to a first embodiment of the present invention.

A row selection circuit 120A shown in FIG. 7 has a control-line selection circuit 121 and a control-line selection driver section 122.

A shutter-mode corresponding section 200A in the row selection circuit 120A includes resistors RVDD and RVSS.

In the row selection circuit 120A in the example shown in FIG. 7, the resistor RVDD is connected between a power-supply terminal TVDD of the control-line selection driver section 122 and a power-supply potential (a power-supply line) VDD and the resistor RVSS is connected between a power-supply terminal TVSS and a reference potential (a power supply line) VSS.

The control-line selection circuit 121 selects a predetermined reset control line RST and a transfer control line TRG from control lines connected to the pixel array section 110.

The control-line selection driver section 122 has multiple drivers DRV for amplifying signals output from the control-line selection circuit 121 and for driving the corresponding control lines.

Each driver DRV in the control-line selection driver section 122 is connected to the corresponding control line (RST or TRG).

The control-line selection driver section 122 has OR gates OG at the input sides of the drivers DRV so as to correspond thereto.

When the shutter-mode switching signal (the control signal) SHRMODE input from the shutter-mode switching section 140 becomes the high level, all reset signals RST for the M reset control lines LRST and all transfer signals TRG for the M transfer control lines LTRG become high levels.

In the operation in the rolling shutter system and in the data-reading operation, the shutter-mode switching signal SHRMODE is set to the low level.

As described above, the resistances RVDD and RVSS having 1/X of the ON resistance of the drivers DRV are connected between the power terminal TVDD and TVSS of the control-line selection driver section 122 and the corresponding power supply lines VDD and VSS.

With this arrangement, in the rolling shutter operation, it is possible to reduce the amount of instantaneous current in the global shutter operation without reducing the drive capability of the drivers.

When the resistors RVDD and RVSS are not provided, a current when the PDs are reset in the rolling shutter system to simultaneously drive the reset signal RST0 and the transfer signal TRG0 can be generally expressed by:

$$Idrr\_1 = (VDD-VSS)/(RVD/2) \tag{1}$$

The instantaneous current during reset of the PDs of all pixels in the global shutter operation can be generally expressed by:

$$Idsg\_1 = (VDD-VSS)/\{RVD/(2M)\} \tag{2}$$

Therefore, the instantaneous current in the global shutter operation relative to the instantaneous current in the rolling shutter operation is generally given by:

$$Idsg\_1/Idrr\_1 = (2M)/2 \tag{3}$$

For a 4Tr-type pixel circuit with an 8 M pixel resolution (2500 rows×3200 columns), M is 2500. Thus, the instantaneous current in the global shutter operation is about 2500 times the instantaneous current in the rolling shutter operation.

In contrast, when the resistors RVDD and RVSS are provided as in the first embodiment, a current when the PDs are reset in the rolling shutter system to simultaneously drive the control lines LRST0 and LTRG0 can be generally expressed by:

$$\begin{aligned}\text{Idrr}\_2 &= (VDD-VSS)/(RVD/2 + RVD/X) \\ &= (VDD-VSS)/\{(2+X) \cdot RVD/2X\} \\ &= \{X/(2+X)\} \cdot \text{Idsr}\_1 \end{aligned} \tag{4}$$

Thus, the larger X is, the lower the drive capability resulting from the addition of the resistors RVDD and RVSS is. For example, for X≫2, a decrease in the drive capability resulting from the addition of the resistors can be ignored due to:

$$Idrr\_2 \approx Idsr\_1 \tag{5}$$

In practice, it is desired that a reduction in the drive capability resulting from the addition of the resistors be about 10% or less.

For example, when X is set larger than 20, the drive capability is about 90% of that of Idsr_1 and thus the timing used in the rolling shutter system and in the reading operation can be satisfied.

The instantaneous current during reset of the PDs of all pixels in the global shutter operation can be generally expressed by:

$$\begin{aligned}\text{Idsg}\_2 &= (VDD-VSS)/\{RVD/(2M) + RVD/X\} \tag{6} \\ &= (VDD-VSS)/\{(M+N+X) \cdot RVD/(2M)/X\} \\ &= (2M) \cdot X/(2M+X)/2 \cdot \text{Idrr}\_1 \end{aligned}$$

In this case, for 2M≫X, the instantaneous current in the global shutter operation is given by equation (7) below and is determined by X regardless of M and N.

$$Idsg\_2 \approx X/2 \cdot Idrr\_1 \tag{7}$$

In practice, when 2M>10·X is satisfied, the current in the global shutter operation can be reduced to about one tenth.

For a 4Tr-type pixel circuit with an 8 M pixel resolution (2500 rows×3200 columns), 2M is 5000. Thus, for X<about 500, the effect of reduction in the instantaneous current is obtained.

Thus, when setting is performed so that 20≤X≤(2M)/10 is satisfied, it is possible to reduce the amount of instantaneous current in the global shutter operation without affecting the operation in the rolling shutter system and the reading operation.

The resistors RVDD and RVSS in the present embodiment may be implemented by metal-oxide semiconductor field-effect transistors (MOSFETs).

The resistors RVDD and RVSS in the present embodiment may contain wiring resistances of the power supply lines for the control-line selection driver section 122.

As another configuration (not shown), the same power-supply lines may be used for the control-line selection circuit 121 and the control-line selection driver section 122. However, during reset of the PDs in the global shutter system, an IR (voltage) drop can occur at the resistors RVDD and RVSS.

Thus, as in the configuration shown in FIG. 7, it is desired that the power supply for a block that can malfunction due to a voltage drop be separated from the power supply for the control-line selection driver section 122.

As described above, in the first embodiment, the resistors RVDD and RVSS are connected between the control-line selection driver section 122 (that serves as a noise source in the global shutter operation) and/or the control-line selection circuit 121 and the corresponding power-supply lines VDD and VSS.

This arrangement can reduce the amount of instantaneous current in the global shutter operation and also can prevent noise generated by the circuit from propagating to another circuit through the power-supply lines VDD and VSS.

Figure 8:
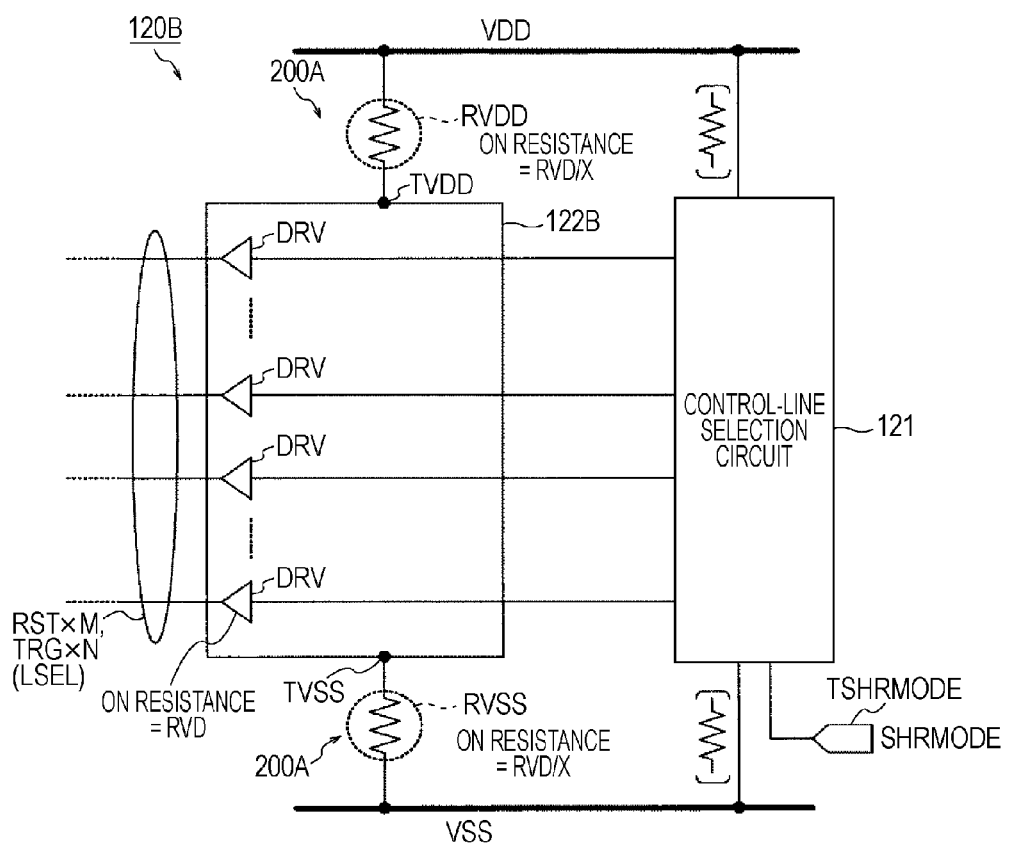
FIG. 8 is a circuit diagram showing another example of the configuration of the row selection circuit according to the first embodiment of the present invention.

As in a row selection circuit shown in FIG. 8, the arrangement may also be such that a control-line selection driver section 122B has no OR gates.

In this case, the shutter-mode switching signal SHRMODE is input to a control-line selection circuit 121.

When the shutter-mode switching signal SHRMODE is at the low level, the control-line selection circuit 121 selects the control lines LRST and LTRG for each row.

When the shutter-mode switching signal SHRMODE is at the high level, the control-line selection circuit 121 may perform control for selecting the control lines LRST and LTRG connected to all pixels.

In order to provide the control-line selection circuit 121 with such a function, the power-supply lines for the control-line selection circuit 121 may be provided with resistors.

As described above, the provision of the resistors between the control-line selection driver section and the corresponding power-supply lines VDD and VSS or between the control-line selection circuit and the control-line selection driver section and the corresponding power-supply lines VDD and VSS makes it possible to prevent noise generated by the circuit in the global shutter operation from propagating to another circuit.

It is also possible to reduce the amount of instantaneous current in the global shutter operation, to reduce a fluctuation in the potential of the power supply, and to prevent image-quality deterioration and device breakdown due to latchup.

Figure 9:
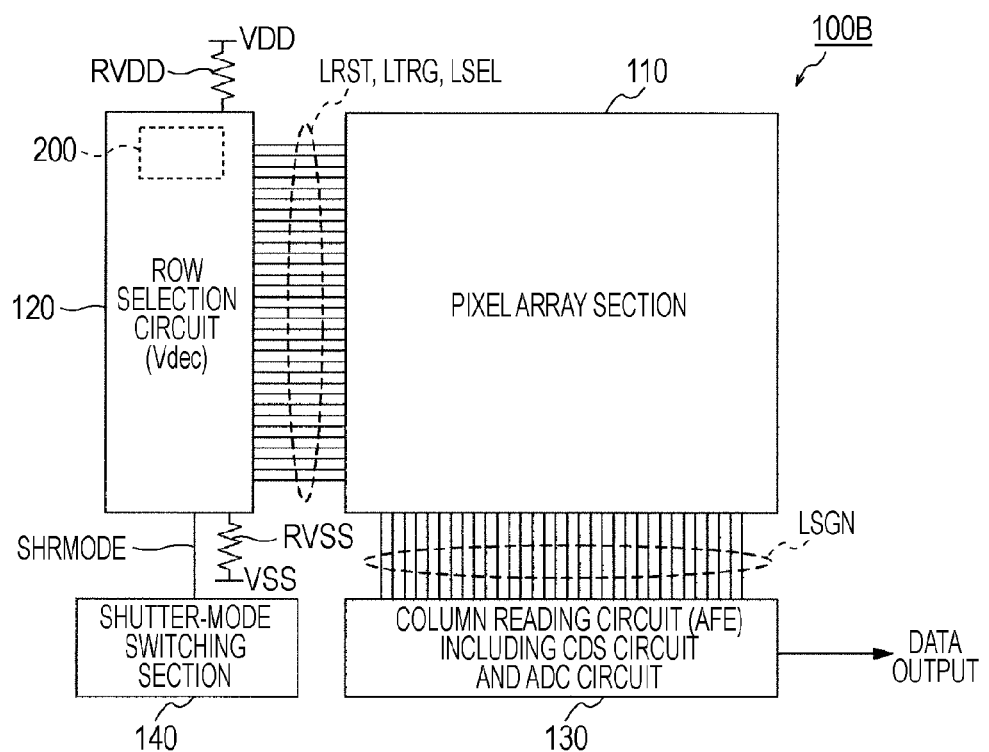
FIG. 9 is a circuit diagram showing an example of the configuration of a shutter-mode corresponding section in the row selection circuit according to the first embodiment of the present invention.

As shown in FIG. 9, the resistors RVDD and RVSS included in the shutter-mode corresponding section 200A can be provided between a power supply terminal of the row selection circuit 120 and the power-supply potential (the power supply line) VDD and between the power supply terminal and the reference potential (the power supply line) VSS, respectively.

Second Embodiment

Figure 10:
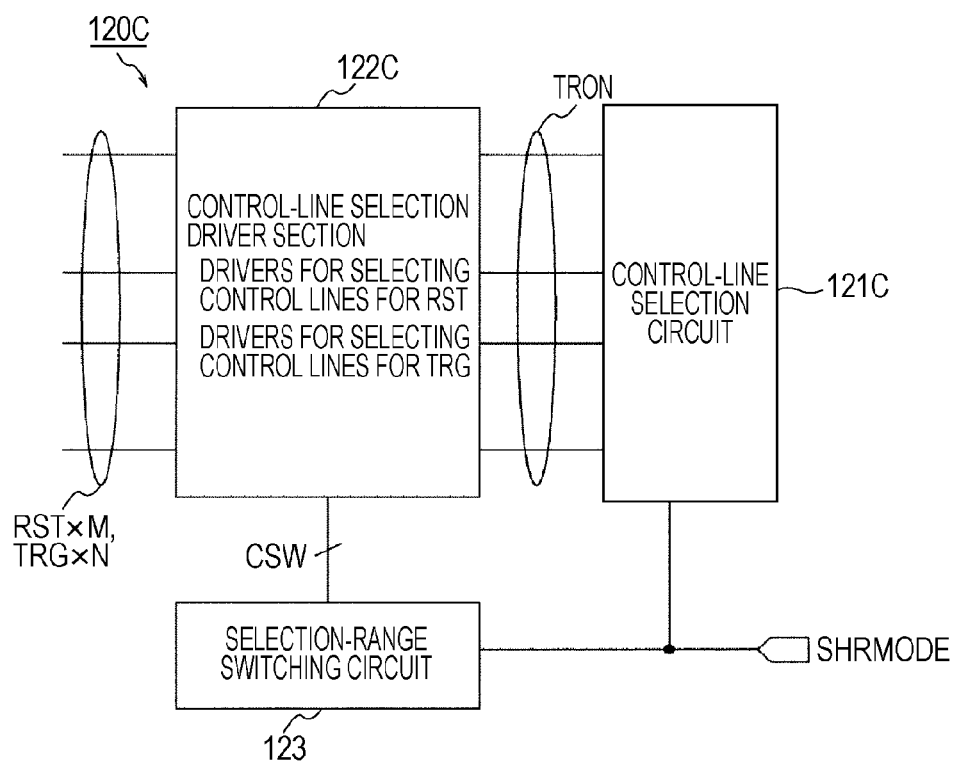
FIG. 10 is a block diagram showing an example of the configuration of a row selection circuit serving as a pixel drive section according to a second embodiment of the present invention.

FIG. 10 is a block diagram showing an example of the configuration of a row selection circuit serving as a pixel drive section according to a second embodiment of the present invention.

An overall configuration of a CMOS image sensor according to the second embodiment of the present invention can have the configuration shown in FIG. 3, as in the first embodiment of the present invention.

A row selection circuit 120C according to the second embodiment has a control-line selection circuit 121C, a control-line selection driver section 122C, and a selection-range switching circuit 123.

In accordance with the shutter-mode switching signal SHRMODE input from the shutter-mode switching section 140, the control-line selection circuit 121C selects a predetermined reset control line LRST and a transfer control line LTRG from control lines connected to the pixel array section 110.

The control-line selection driver section 122C has multiple drivers DRV for amplifying signals from the control-line selection circuit 121C and for driving the corresponding control lines.

Each driver DRV in the control-line selection driver section 122C is connected to the corresponding control line (LRST or LTRG).

The selection-range switching circuit 123 selects a driver or drivers in a predetermined range from the drivers in the control-line selection driver section.

The selection-range switching circuit 123 specifies a selection range by using a selection-range switching signal CSW.

The selection-range switching circuit 123 generates a selection-range switching signal CSW corresponding to the shutter-mode switching signal SHRMODE input from the shutter-mode switching section 140.

During reset of the PDs in the global shutter operation, the selection-range switching circuit 123 selects all drivers in the control-line selection driver section by using the selection-range switching signal CSW.

In the rolling shutter operation, the selection-range switching circuit 123 selects at least one of the drivers (i.e., for each row) by using the selection-range switching signal CSW.

Figure 11:
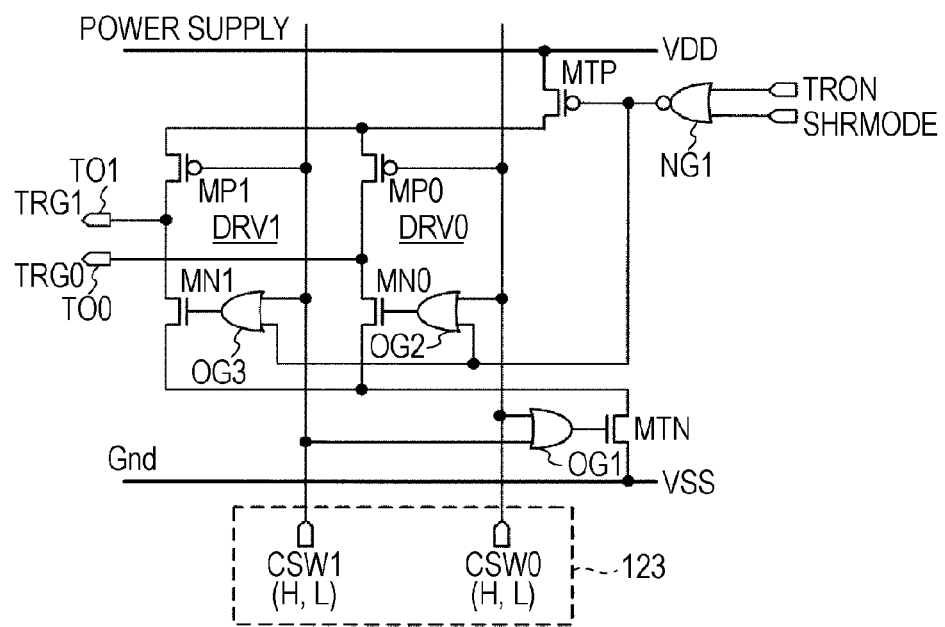
FIG. 11 is a circuit diagram showing an example of the configuration of a control-line selection driver section according to the second embodiment of the present invention.

FIG. 11 is a circuit diagram showing an example of the configuration of the control-line selection driver section 122C according to the second embodiment of the present invention.

For ease of understanding, the control-line selection driver section 122C shown in FIG. 11 has a circuit configuration including drivers DRV0 and DRV1 corresponding to two control lines LTRG0 and LTRG1 and a circuit serving as a shutter-mode corresponding section 200C.

The shutter-mode corresponding section 200C in this case also substantially has a function for causing an impedance value (e.g., a resistance value or a reactance value) viewed from the control lines to the power supply in the global shutter operation to be greater than an impedance value in the rolling shutter operation.

The control-line selection driver section 122C includes p-channel MOS (PMOS) transistors MTP, MP0, and MP1, re-channel MOS (NMOS) transistors MTN, MN0, and MN1, a NOR gate NG1, and OR gates OG1, OG2, and OG3.

The shutter-mode switching signal SHRMODE is supplied to one input of the NOR gate NG1 and a timing control signal TRON is supplied to another input of the NOR gate NG1. An output of the NOR gate NG1 is connected to a gate of the PMOS transistor MTP.

A source of the PMOS transistor MTP is connected to the power-supply potential (the power-supply line) VDD, and a drain of the PMOS transistor MTP is connected to sources of the PMOS transistors MP0 and MP1.

A source of the NMOS transistor MTN is connected to the reference potential (the power-supply line) VSS, and a drain of the NMOS transistor MTN is connected to drains of the NMOS transistors MN0 and MN1.

A drain of the PMOS transistor MP0 and the drain of the NMOS transistor MN0 are connected to each other and its interconnection point is connected to an output terminal TO0 connected to the control line LTRG0.

A drain of the PMOS transistor MP1 and the drain of the NMOS transistor MN1 are connected to each other and its interconnection point is connected to an output terminal TO1 connected to the control line LTRG1.

A selection-range switching signal CSW0 is supplied to one input of the OR gate OG1 and a selection-range switching signal CSW1 is supplied to another input of the OR gate OG1. An output of the OR gate OG1 is connected to a gate of the NMOS transistor MTN.

The selection-range switching signal CSW0 is also supplied to a gate of the PMOS transistor MP0 and one input of the OR gate OG2.

The selection-range switching signal CSW1 is supplied to a gate of the PMOS transistor MP1 and one input of the OR gate OG3.

Other inputs of the OR gates OG2 and OG3 are connected to the output of the NOR gate NG1.

An output of the OR gate OG2 is connected to a gate of the NMOS transistor MN0 and an output of the OR gate OG3 is connected to a gate of the NMOS transistor MN1.

In this configuration, the PMOS transistor MP0 and the NMOS transistor MN0 constitute a driver DRV0 and the PMOS transistor MP1 and the NMOS transistor MN1 constitute a driver DRV1.

The PMOS transistor MTP, the NMOS transistor MTN, the NOR gate NG1, the OR gates OG1 to OG3, and the selection-range switching circuit 123 constitute the shutter-mode corresponding section 200C.

The driver DRV0 for the control line TRG0 and the driver DRV1 for the control line LTRG1 share the timing control signal TRON and the transistors MTP and MTN.

Although the description in FIG. 11 is given of an example of the control-line selection driver section for the transfer control lines LTRG, a similar configuration can also be used for the control-line selection driver section for the reset control lines LRST.

Next, the operation of the control-line selection driver section 122C having the configuration shown in FIG. 11 will be described in connection with FIGS. 12, 13, and 14.

Figure 12:
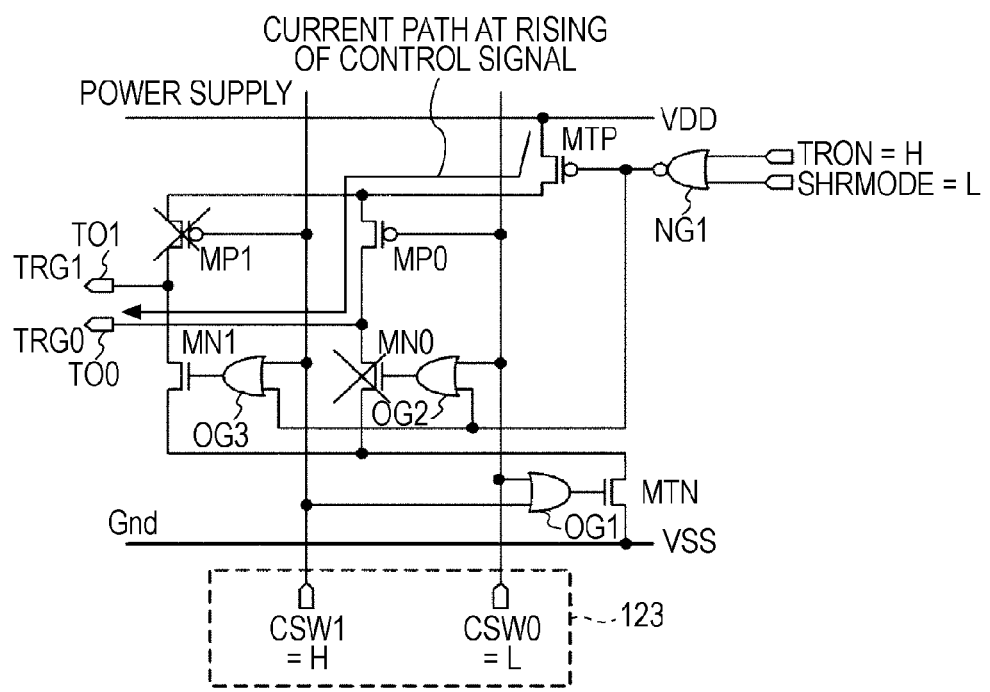
FIG. 12 is a diagram illustrating an operation when a driver is driven in a rolling shutter operation.

FIG. 12 is a diagram illustrating an operation when the driver DRV0 is driven in the rolling shutter operation.

Figure 13:
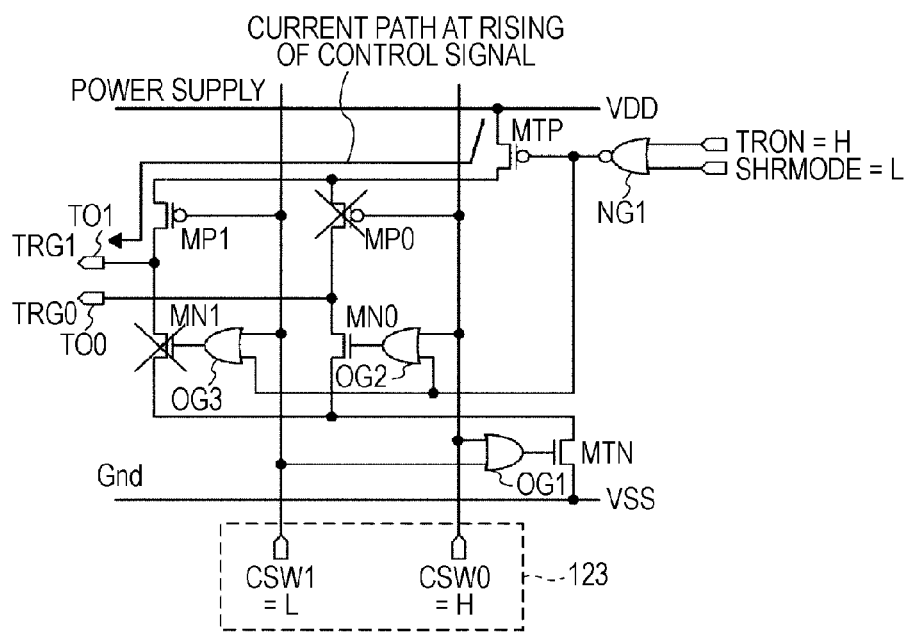
FIG. 13 is a diagram illustrating an operation when another driver is driven in the rolling shutter operation.

FIG. 13 is a diagram illustrating an operation when the driver DRV1 is driven in the rolling shutter operation.

Figure 14:
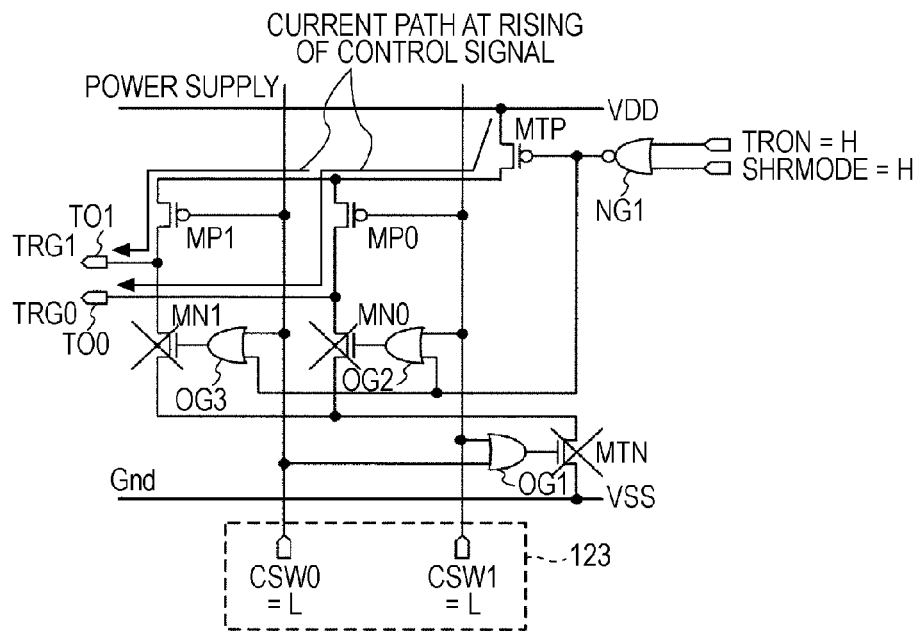
FIG. 14 is a diagram illustrating a global shutter operation.

FIG. 14 is a diagram showing an operation in the global shutter operation.

In the rolling shutter operation, as shown in FIGS. 12 and 13, the shutter-mode switching signal SHRMODE is set to the low (L) level and the timing control signal TRON for a row to be selected is set to a high (H) level.

The switching for driving the control lines LTRG0 and LTRG1 is performed by the selection-range switching signals CSW0 and CSW1.

When the timing control signal TRON is at the high (H) level, the selection-range switching signal CSW0 is at the low (L) level, and the selection-range switching signal CSW1 is at the high (H) level, as shown in FIG. 12, the transistors MP0 and NM1 are turned on and the transistor MP1 and MN0 are turned off.

As a result, the control line LTRG0 is selected as shown in FIG. 12. At this point, as shown in FIG. 12, current is supplied to the control line LTRG0 via the transistors MTP and MP0.

When the timing control signal TRON is at the high (H) level, the selection-range switching signal CSW0 is at the high (H) level, and the selection-range switching signal CSW1 is at the low (L) level, as shown in FIG. 13, the transistors MP0 and NM1 are turned off and the transistor MP1 and MN0 are turned on.

As a result, the control line LTRG1 is selected as shown in FIG. 13. At this point, as shown in FIG. 13, current is supplied to the control line LTRG1 via the transistors MTP and MP1.

When all control lines LTRG are to be selected through reset of the PDs in the global shutter operation, both of the selection-range switching signals CSW0 and CSW1 are set to the low (L) levels and the shutter-mode switching signal SHRMODE is set to the high (H) level.

As a result, the transistors MP0 and MP1 are turned on and the transistors MN0 and MN1 are turned off, so that both of the control lines LTRG0 and LTRG1 are selected.

In this case, both current flowing through the control line LTRG0 and current flowing through the control line LTRG1 have gone through the transistor MTP. Thus, a resistance value (an impedance value) viewed from the control lines TRG0 and TRG1 to the power supply is larger than a resistance value in the rolling shutter operation and thus the amount of current decreases correspondingly.

According to an increase in the number of drivers that share the transistor, the amount of current also increases.

Figure 15:
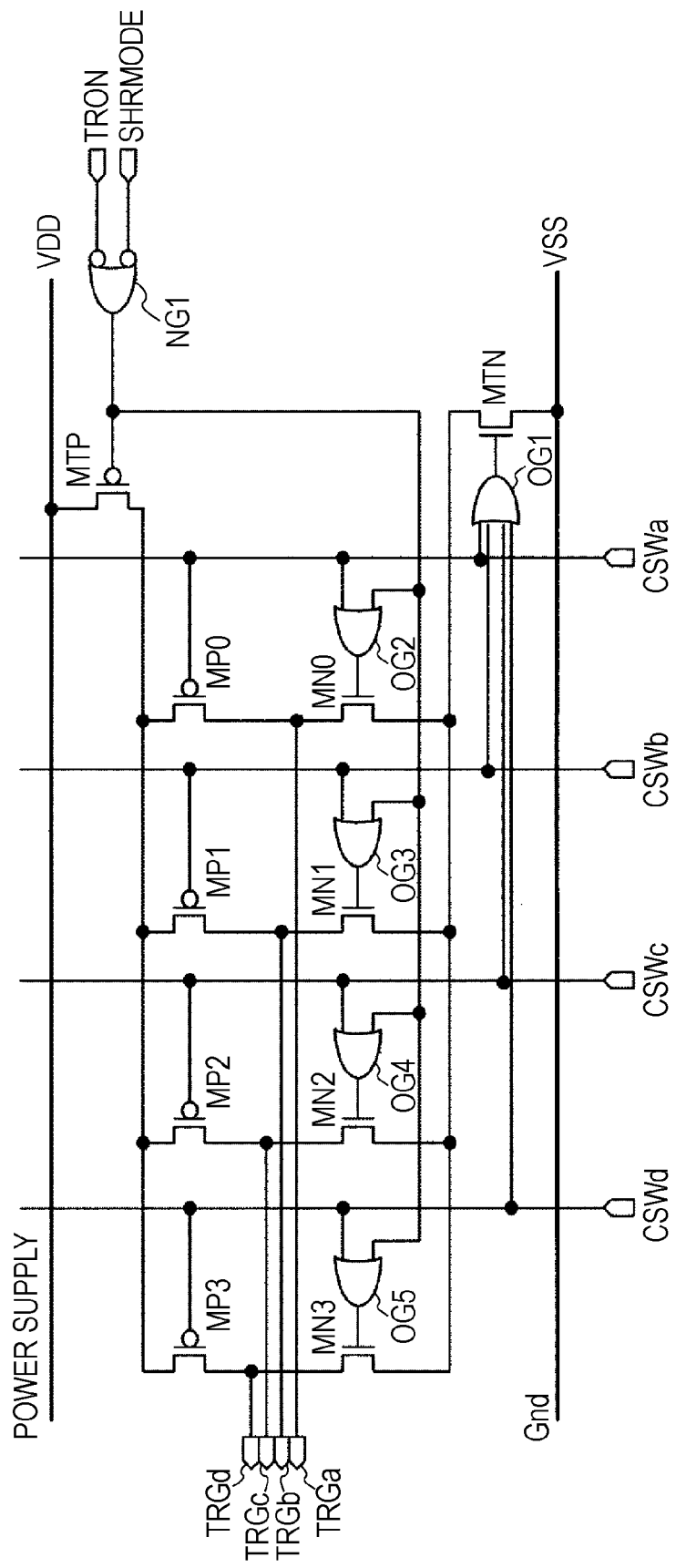
FIG. 15 is a circuit diagram showing an example in which drivers for four control lines share a power-supply-side transistor.

FIG. 15 shows a case in which the drivers DRV0 to DRV3 for four control lines LTRGa to LTRGd share the power-supply-side transistor MTP. The amount of current when potentials of all control lines LTRG are changed becomes smaller in the configuration shown in FIG. 15 than in the case in which only the drivers DRV0 and DRV1 share the power-supply-side transistor MTP.

In the configuration shown in FIG. 15, the drivers DRV2 and DRV3 are further provided in parallel to the configuration shown in FIG. 11.

As described above, the configuration in which the drivers for the control lines share the transistor is particularly effective for a case in which the control lines LTRG0 and LTRG1 are exclusively controlled in a time division manner and are not simultaneously turned on in the rolling shutter operation.

Figure 16:
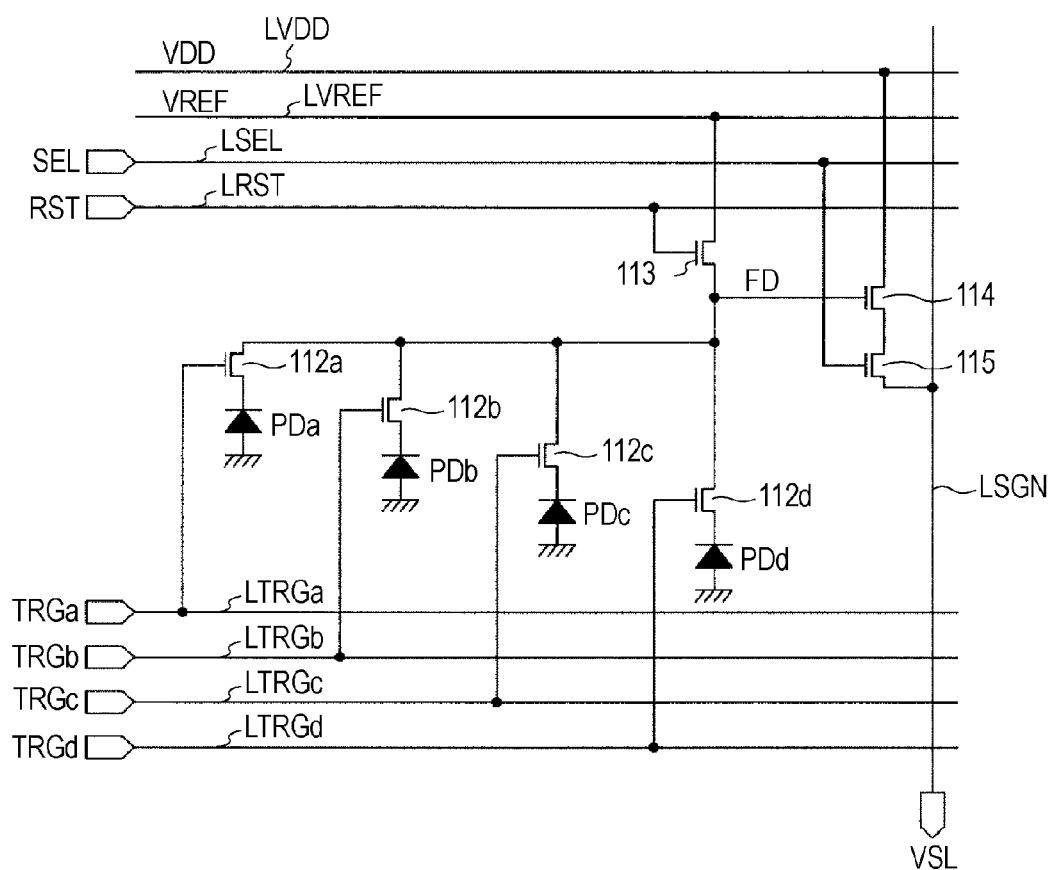
FIG. 16 is a diagram showing an example of the configuration of a pixel circuit in which four pixels share a reset transistor, an amplification transistor, and a selection transistor.

FIG. 16 shows a 4Tr-tr sharing-type pixel circuit in which four pixels share a reset transistor 113, an amplification transistor 114, and a selection transistor 115. When a Bayer arrangement color filter is combined with the pixel circuit shown in FIG. 16, the following control may be performed.

That is, in the Bayer arrangement, timing control may be performed for each color in a time-division manner in a configuration in which a photoelectric conversion element PDa is implemented with a red photodiode, photoelectric conversion elements PDb and PDc are implemented with green photodiodes, a photoelectric conversion element PDd is implemented with a blue photodiode, TRGa is a transfer signal for red, TRGb and TRGc are transfer signals for green, and TRGd is a transfer signal for blue.

Figure 17:
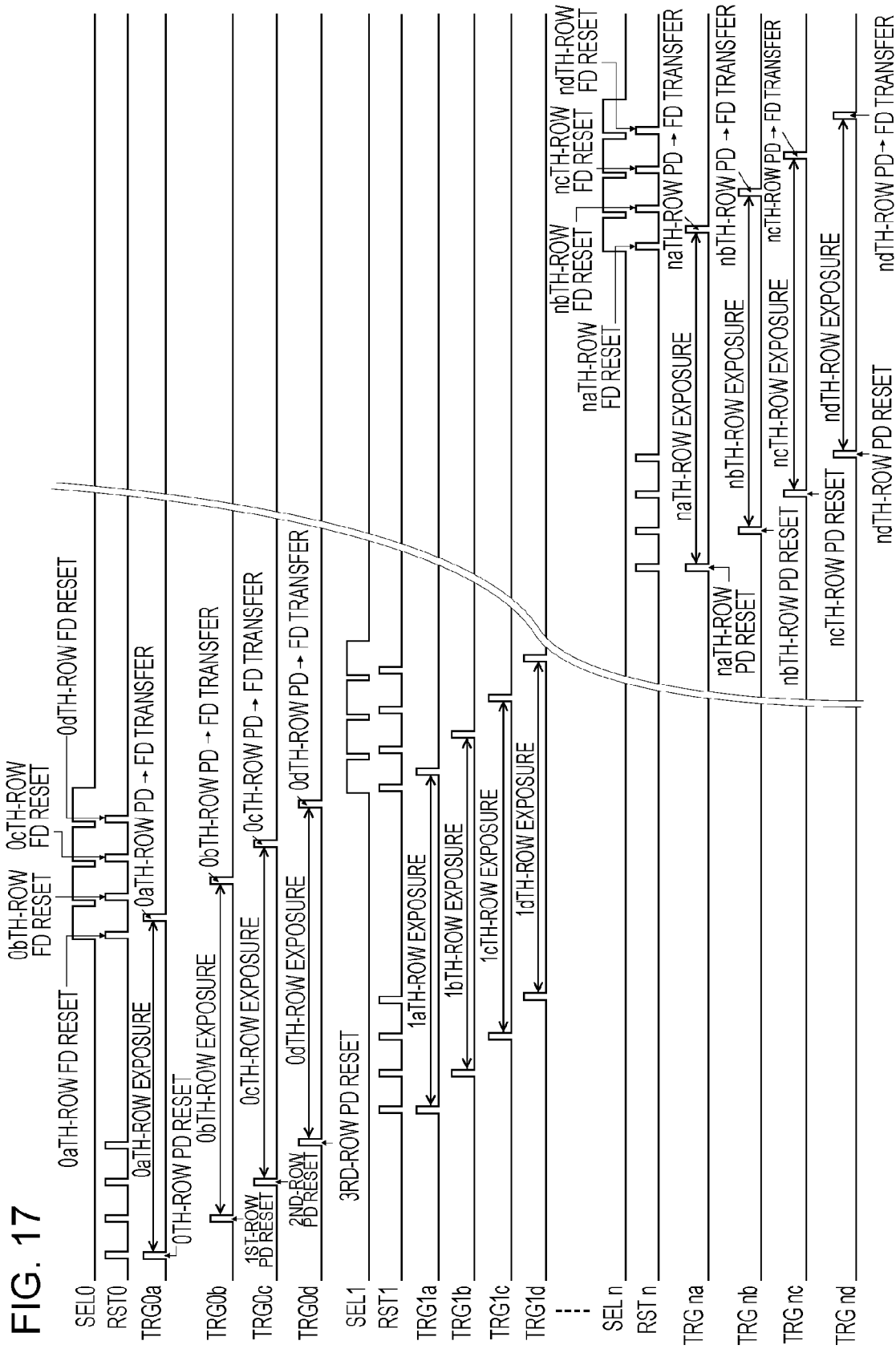
FIG. 17 is a timing chart showing an operation in the rolling shutter system for a CMOS image sensor employing the pixel circuit shown in FIG. 16.

FIG. 17 is a timing chart showing an operation in the rolling shutter system for a CMOS image sensor employing the pixel circuit shown in FIG. 16.

In the rolling shutter operation, the operation of each row is controlled in order of "FD/PD reset", "exposure", "pixel signal reading", "FD/PD reset", and "reading of FD reset".

In this case, the selection transistor 115 and the reset transistor 113 are shared in the zeroth to third rows and the fourth to seventh rows.

Thus, control for the zeroth to third rows is performed using control lines LRST0, LSEL0, LTRGa0, LTRGb0, LTRGc0, and LTRGd0. Thus, control for the fourth to seventh rows is performed using control lines LRST1, LSEL1, LTRGa1, LTRGb1, LTRGc1, and LTRGd1. For example, during reset of the PDs in the zeroth row, a reset signal RST0 and a transfer signal TRGa0 become high levels, and during reset of the PDs in the first row, the reset signal RST0 and a transfer signal TRGb0 become high levels.

Figure 18:
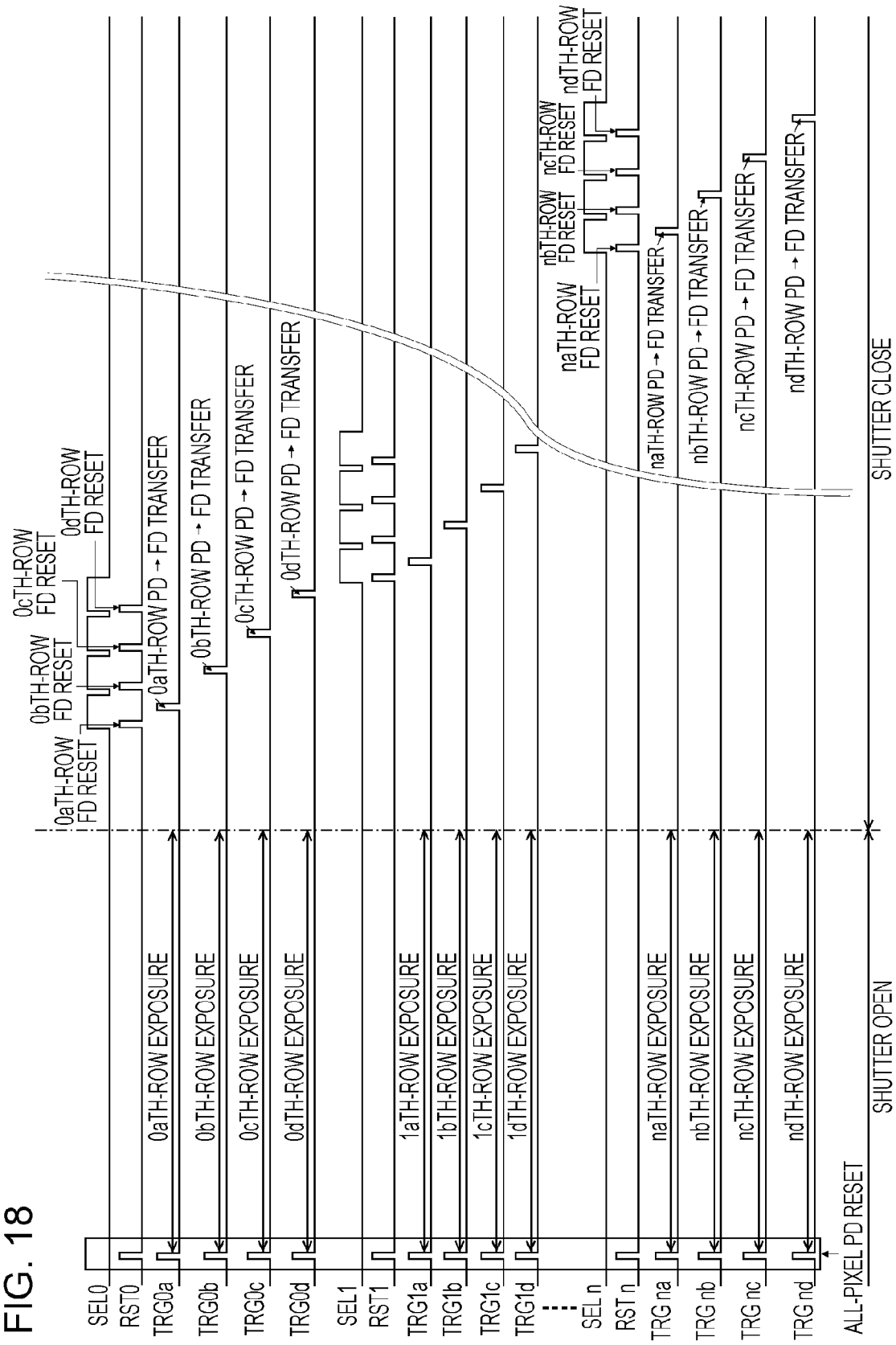
FIG. 18 is a timing chart showing an operation in the global shutter system when the CMOS image sensor employing the pixel circuit shown in FIG. 16 and a liquid-crystal shutter or mechanical shutter are combined.

FIG. 18 is a timing chart showing an operation in the global shutter system when the CMOS image sensor employing the pixel circuit shown in FIG. 16 and a liquid-crystal shutter or mechanical shutter are combined.

In this case, as in the above-described 4Tr-type pixel circuit, the PDs in all pixels are simultaneously reset and exposed while the shutter is open, and then the shutter is closed to read data for each row. During reset of the PDs in all pixels, all control lines LRST and LTRG are simultaneously controlled.

Next, an example of a timing chart when the CMOS image sensor employing the pixel circuit shown in FIG. 16 changes an exposure time for each color will be described in connection with FIGS. 19 and 20.

Figure 19:
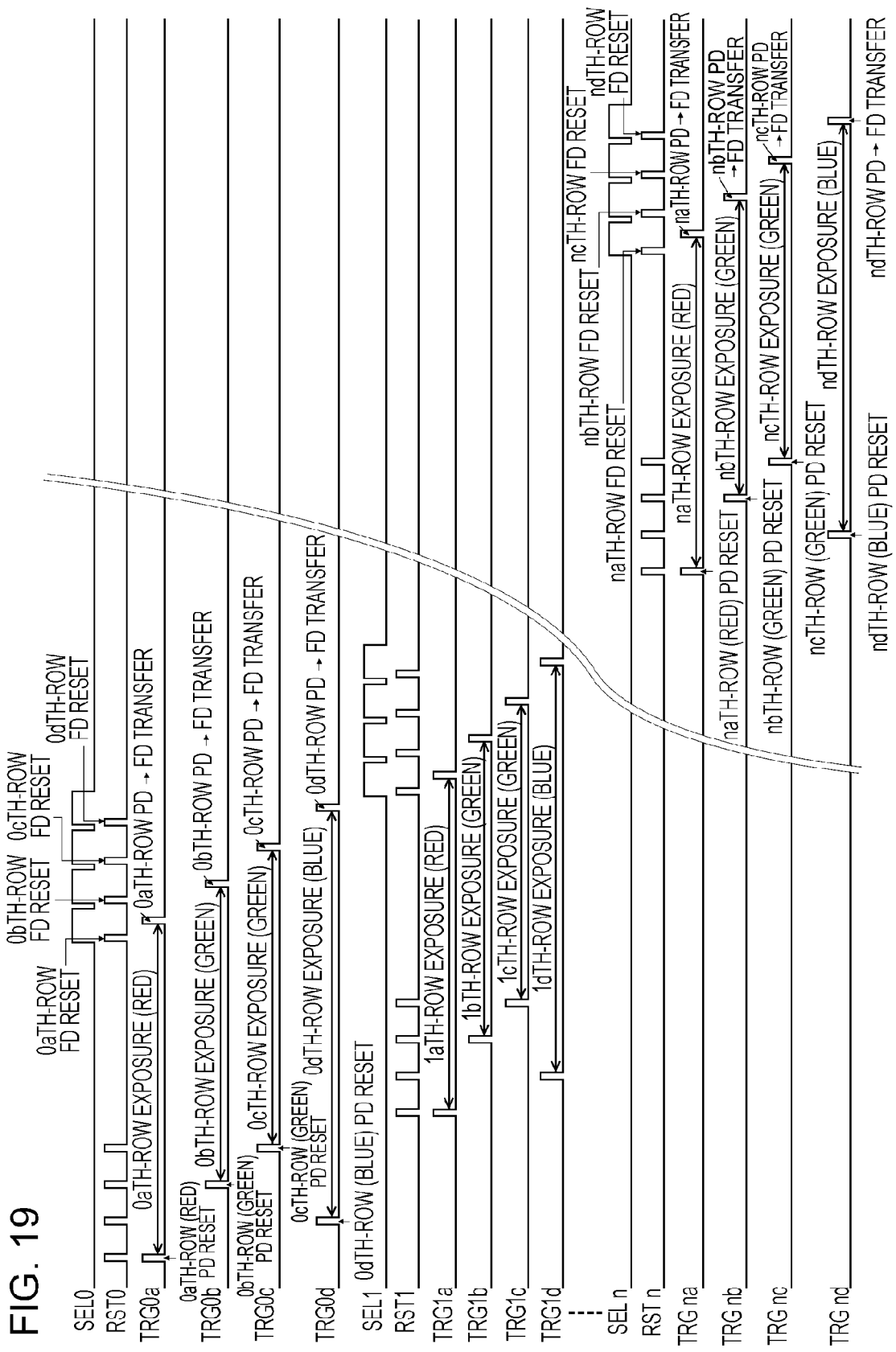
FIG. 19 is a timing chart showing an example of an operation in the rolling shutter operation for the CMOS image sensor employing the pixel circuit shown in FIG. 16 when an exposure time is varied for each color.
Figure 20:
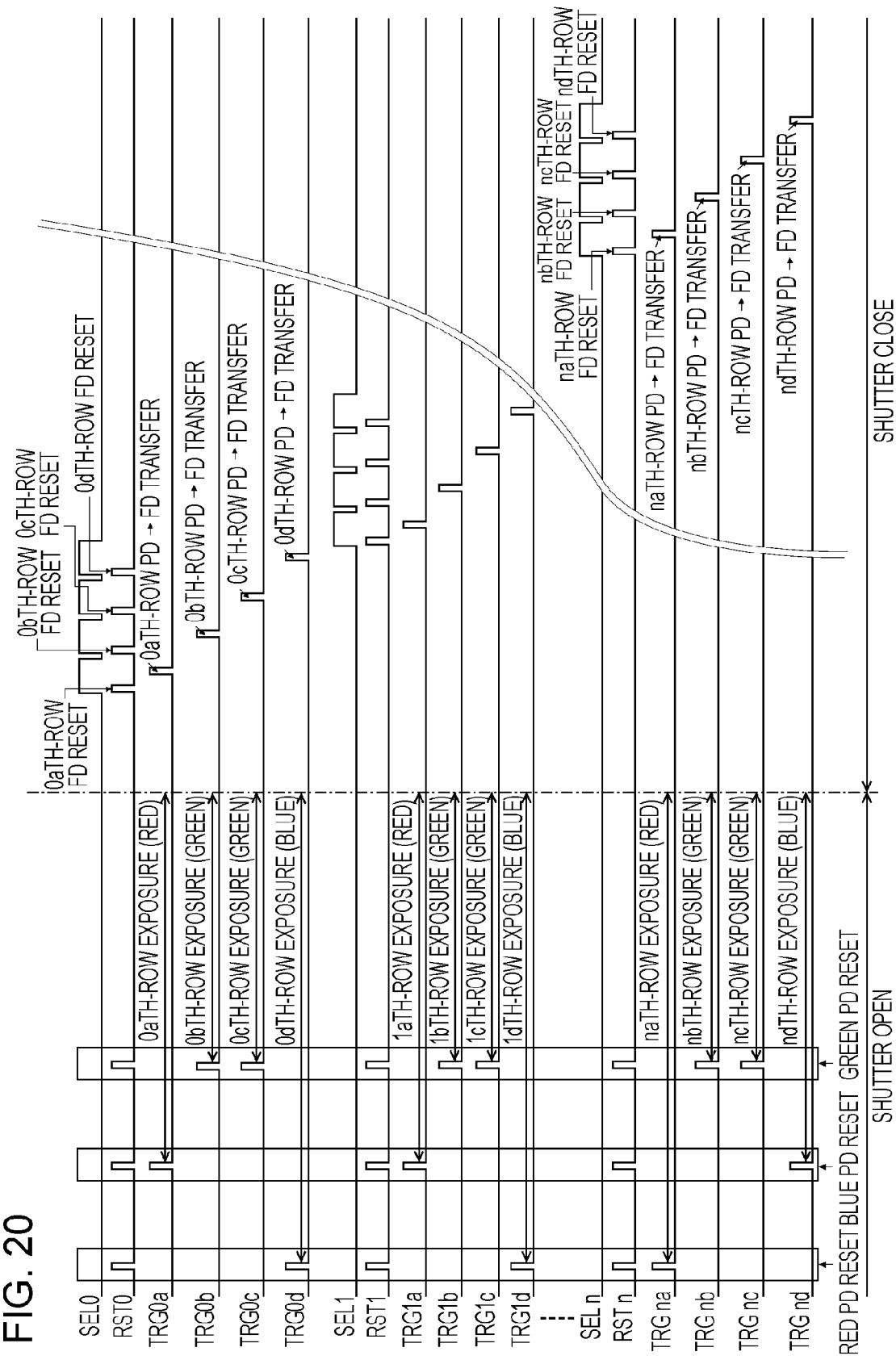
FIG. 20 is a timing chart showing an example of an operation in the global shutter operation for the CMOS image sensor employing the pixel circuit shown in FIG. 16 when the exposure time is varied for each color.

In examples shown in FIGS. 19 and 20, the color filter for the photoelectric conversion element PDa is red, the color filters for the photoelectric conversion elements PDb and PDc are green, the color filter for the photoelectric conversion element PDd is blue, the transfer signal TRGa is red, the transfer signals TRGb and TRGc are green, and the transfer signal TRGd is blue.

FIG. 19 is a timing chart for the rolling shutter system. Reading is sequentially performed for each row as in the above-described 4Tr-type pixel circuit, whereas the timing of reset of the PDs is controlled for each color to vary the exposure time for each color.

FIG. 20 is a timing chart for the global shutter system. In the global shutter system, the timing of reset of the PDs is also controlled for each color to vary the exposure time for each color.

In the present embodiment, even when the exposure time is varied for each color, it is desired that the number of PDs to be reset at the same time be constant.

With such an arrangement, the amount of current flowing through the row selection circuit becomes constant in any PD reset operation, and thus the amount of noise induced by the row selection circuit also becomes constant during reading from any pixels.

With such a configuration, the selection-range switching signal CSW can be shared by the multiple drivers. In addition, since the control-line selection circuit can be shared by the multiple control lines LTRG, the size of the selection circuit for the control lines and so on can be reduced.

As the pitch of the pixels is reduced, it is necessary that the pitch of the rows in the control-line selection circuit generally be reduced. According to the selection circuit of the control-line selection driver section shown in FIGS. 11 and 15, the number of timing control signals TRON and RSTON output from the control-line selection circuit is reduced to one half to one fourth. Thus, for the control-line selection circuit, the layout can be efficiently performed using the pitch of twice to fourth the pixel pitch, and thus the size and cost can also be reduced.

According to the second embodiment, as described above, it is also possible to reduce the amount of instantaneous current in the global shutter operation, to reduce a fluctuation in the potential of the power supply, and to prevent image-quality deterioration and device breakdown due to latchup. In addition, this arrangement allows multiple control lines to share the control-line selection circuit and also can reduce the layout size and the cost.

Third Embodiment

Figure 21:
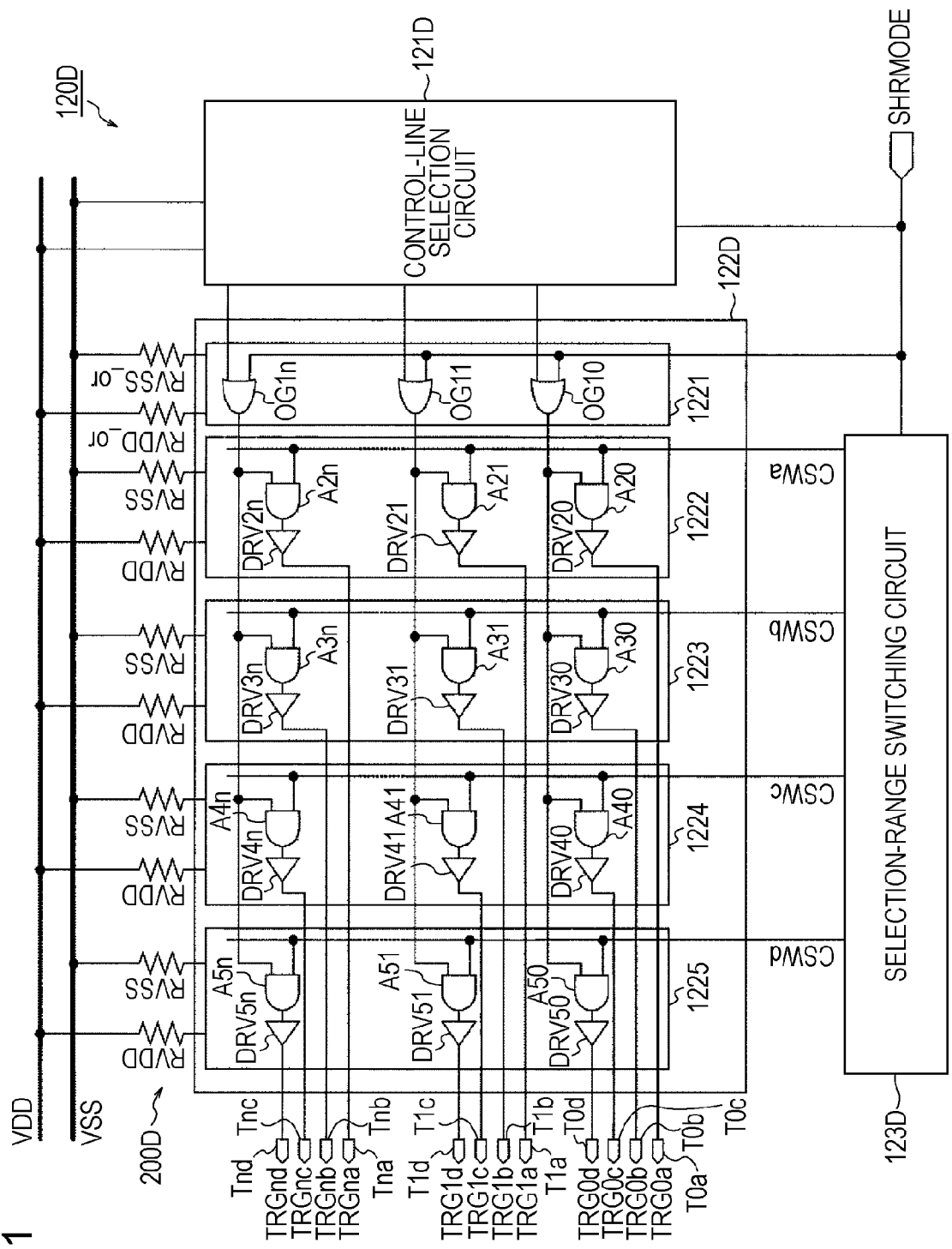
FIG. 21 is a block diagram showing an example of the configuration of a row selection circuit serving as a pixel drive section according to a third embodiment of the present invention.

FIG. 21 is a block diagram showing an example of the configuration of a row selection circuit serving as a pixel drive section according to a third embodiment of the present invention.

An overall configuration of a CMOS image sensor according to the third embodiment of the present invention can have the configuration shown in FIG. 3, as in the first embodiment of the present invention.

A row selection circuit 120D according to the third embodiment has a control-line selection circuit 121D, a control-line selection driver section 122D, and a selection-range switching circuit 123D.

In accordance with the shutter-mode switching signal SHRMODE input from the shutter-mode switching section 140, the control-line selection circuit 121D selects a predetermined reset control line LRST and a transfer control line LTRG from the control lines connected to the pixel array section 110.

The control-line selection driver section 122D has a gate array 1221 and driver arrays 1222 to 1225 for amplifying signals from the control-line selection circuit 121D and for driving the corresponding control lines.

The selection-range switching circuit 123D selects a driver or drivers in a predetermined area from the driver arrays 1222 to 1225 in the control-line selection driver section 122D.

The selection-range switching circuit 123D specifies a selection range by using selection-range switching signals CSW.

The selection-range switching circuit 123D generates selection-range switching signals CSWa, CSWb, CSWc, and CSWd corresponding to the shutter-mode switching signal SHRMODE input from the shutter-mode switching section 140.

By using the selection-range switching signals CSWa, CSWb, CSWc, and CSWd, the selection-range switching circuit 123D selects the driver arrays 1222 to 1225 in the control-line selection driver section 122D.

The gate array 1221 has OR gates OG10 to OG1$n$.

The shutter-mode switching signal SHRMODE is supplied to first inputs of the OR gates OG10 to OG1$n$ and a control signal from the control-line selection circuit 121D is supplied to second inputs of the OR gates OG10 to OG1$n$.

The driver array 1222 has AND gates A20 to A2$n$ and drivers DRV20 to DRV2$n$. The drivers DRV20 to DRV2$n$ are connected to outputs of the corresponding AND gates A20 to A2$n$.

The shutter-mode switching signal SHRMODE is supplied to first inputs of the AND gates A20 to A2$n$, and outputs of the corresponding OR gates OG10 to OG1$n$ in the gate array 1221 are connected to second inputs of the AND gates A20 to A2$n$.

An output of the driver DRV20 is connected to an output terminal T0$a$ connected to a control line LTRG0$a$.

An output of the driver DRV21 is connected to an output terminal T1$a$ connected to a control line LTRG1$a$.

An output of the driver DRV2$n$ is connected to an output terminal Tna connected to a control line LTRGna.

The driver array 1223 has AND gates A30 to A3$n$ and drivers DRV30 to DRV3$n$. The drivers DRV30 to DRV3$n$ are connected to outputs of the corresponding AND gates A30 to A3$n$.

The shutter-mode switching signal SHRMODE is supplied to first inputs of the AND gates A30 to A3$n$, and outputs of the corresponding OR gates OG10 to OG1$n$ in the gate array 1221 are connected to second inputs of the AND gates A30 to A3$n$.

An output of the driver DRV30 is connected to an output terminal T0$b$ connected to a control line LTRG0$b$.

An output of the driver DRV31 is connected to an output terminal T1$b$ connected to a control line LTRG1$b$.

An output of the driver DRV3$n$ is connected to an output terminal Tnb connected to a control line LTRGnb.

The driver array 1224 has AND gates A40 to A4$n$ and drivers DRV40 to DRV4$n$. The drivers DRV40 to DRV4$n$ are connected to outputs of the corresponding AND gates A40 to A4$n$.

The shutter-mode switching signal SHRMODE is supplied to first inputs of the AND gates A40 to A4$n$, and outputs of the corresponding OR gates OG10 to OG1$n$ in the gate array 1221 are connected to second inputs of the AND gates A40 to A4$n$.

An output of the driver DRV40 is connected to an output terminal T0$c$ connected to a control line LTRG0$c$.

An output of the driver DRV41 is connected to an output terminal T1$c$ connected to a control line LTRG1$c$.

An output of the driver DRV4$n$ is connected to an output terminal Tnc connected to a control line LTRGnc.

The driver array 1225 has AND gates A50 to A5$n$ and drivers DRV50 to DRV5$n$. The drivers DRV50 to DRV5$n$ are connected to outputs of the corresponding AND gates A50 to A5$n$.

The shutter-mode switching signal SHRMODE is supplied to first inputs of the AND gates A50 to A5$n$, and outputs of the corresponding OR gates OG10 to OG1n in the gate array 1221 are connected to second inputs of the AND gates A50 to A5n.

An output of the driver DRV50 is connected to an output terminal T0d connected to a control line LTRG0d.

An output of the driver DRV51 is connected to an output terminal T1d connected to a control line LTRG1d.

An output of the driver DRV5n is connected to an output terminal Tnd connected to a control line LTRGnd.

In the third embodiment, resistors RVDD are connected between corresponding power supply terminals TVDD of the driver arrays 1222 to 1225 and the power-supply potential (the power supply line) VDD, and resistors RVSS are connected between corresponding power-supply terminals TVSS of the driver arrays 1222 to 1225 and the reference potential (the power supply line) VSS.

A resistor RVDD_or is connected between a power-supply terminal TVDD of the gate array 1221 and the power-supply potential (the power supply line) VDD and an RVSS_or is connected between a power-supply terminal TVSS of the gate array 1221 and the reference potential (the power supply line) VSS.

As in the first embodiment, the resistors RVDD and RVSS and the resistors RVDD_or and RVSS_or constitute a shutter-mode corresponding section 200D.

For ease of understanding, the same representations as the resistors RVDD and RVSS and the resistors RVDD_or and RVSS_or are used for the resistance values thereof.

The shutter-mode corresponding section 200D in this case also substantially has a function for causing an impedance value (e.g., a resistance value or a reactance value) viewed from the control lines to the power supply in the global shutter operation to be greater than an impedance value in the rolling shutter operation.

Although the description in FIG. 21 is given of an example of the control-line selection driver section for the transfer control lines LTRG, a similar configuration can also be used for the control-line selection driver section for the reset control lines LRST.

In the row selection circuit 120D shown in FIG. 21, the shutter-mode switching signal SHRMODE is held at the low level when the operation is performed in the rolling shutter system and when data is read.

Consequently, only the control line LTRG in a row selected by the control-line selection circuit 121D is selected.

Conversely, when the PDs in the predetermined pixels are simultaneously reset in the global shutter system, the shutter-mode switching signal SHRMODE is set to the high level.

Consequently, all control lines for the driver arrays selected by the selection-range switching signals CSWa to CSWd input from the selection-range switching circuit 123D are selected.

As described above, the resistors RVDD having a resistance value "RVDD" are connected between the driver arrays 1222 to 1225 and the power supply line VDD and the resistors RVSS having a resistance value "RVSS" are connected between the driver arrays 1222 to 1225 and the power-supply line VSS.

Also, the resistor RVDD_or having a resistance value "RVDD_or" is connected between the gate array 1221 and the power supply line VDD and the resistor RVSS_or having a resistance value "RVSS_or" is connected between the gate array 1221 and the power-supply line VSS.

The resistances RVDD and RVSS are set sufficiently smaller than an ON resistance RVD of each TRG driver and are set sufficiently larger than an ON resistance RVD×N when all drivers arranged in the driver array are simultaneously driven.

More specifically, the resistance values RVDD and RVSS are set so as to generally satisfy:

$$10 \times RVD < RVDD < 10 \times RVD/N \text{ and}$$
$$10 \times RVD < RVSS < 10 \times RVD/N.$$

The resistances RVDD_or and RVSS_or are set sufficiently smaller than a resistance value of each OR gate, and are also set sufficiently larger than an ON resistance Ror when all gates arranged in the OR gate array are simultaneously switched.

More specifically, the resistance values are set so as to generally satisfy:

$$10 \times Ror < RVDD\_or < 10 \times Ror/N \text{ and}$$
$$10 \times Ror < RVSS\_or < 10 \times Ror/N.$$

With this arrangement, during exposure in the rolling shutter system or during reading after exposure in the global shutter system, appropriate timing can be achieved with almost no reduction in the drive capability of the drivers for the control lines LTRG.

When N to 4×N control-line LTRG drivers and N OR gates are simultaneously inverted in the global shutter system, the amount of instantaneous current can be reduced to about 10% compared to the case in which no resistance is provided.

In addition, the drivers in the TRGa to TRGd driver arrays 1222 to 1225 and the gate array 1221 are connected to the power supply lines via the corresponding resistors. Thus, even when the global shutter operation is performed for each color, fluctuations in the power-supply lines for rows on which PD reset is not performed are small.

It is now assumed that, in the example shown in FIG. 16, driving is performed for a case in which the color filter for the photoelectric conversion element PDa is red, the color filters for the photoelectric conversion elements PDb and PDc are green, the color filter for the photoelectric conversion element PDd is blue, the transfer signal TRGa is red, the transfer signals TRGb and TRGc are green, and the transfer signal TRGd is blue.

For example, when the driving is performed in the global shutter system for each color at timings shown in an example in FIG. 20, the green PDs are reset after resetting the red and blue PDs and thus the following feature is provided.

Even when all drivers in the TRGb driver array 1223 and the TRGc driver array 1224 and all gates in the gate array 1221 are switched, fluctuations in the power supply lines for the TRGa driver array 1222 and the TRGd driver array 1225 can be reduced.

As described above, according to the third embodiment, it is possible to prevent noise generated by the circuit in the global shutter operation from propagating to another circuit.

In particular, even when the global shutter operation is performed for each color, it is possible to suppress deterioration of the image quality. It is also possible to reduce the amount of instantaneous current in the global shutter operation, to reduce a fluctuation in the potential of the power supply, and to prevent image-quality deterioration and device breakdown due to latchup.

Fourth Embodiment

Figure 22:
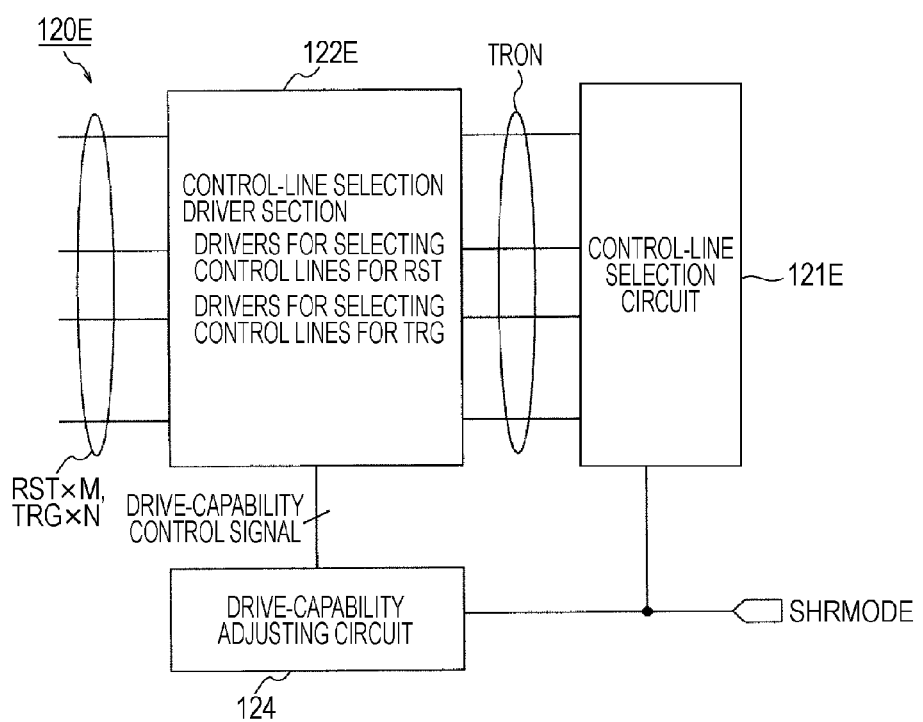
FIG. 22 is a block diagram showing an example of the configuration of a row selection circuit serving as a pixel drive section according to a fourth embodiment of the present invention.

FIG. 22 is a block diagram showing an example of the configuration of a row selection circuit serving as a pixel drive section according to a fourth embodiment of the present invention.

An overall configuration of a CMOS image sensor according to the fourth embodiment of the present invention can have the configuration shown in FIG. 3, as in the first embodiment of the present invention.

A row selection circuit 120E according to the fourth embodiment has a control-line selection circuit 121E, a control-line selection driver section 122E, and a drive-capability adjusting circuit 124.

In accordance with the shutter-mode switching signal SHRMODE input from the shutter-mode switching section 140, the control-line selection circuit 121E selects a predetermined reset control line LRST and a transfer control line LTRG from the control lines connected to the pixel array section 110.

The control-line selection circuit 121E selects all control lines RST and TRG during reset of the PDs in the global shutter operation.

The control-line selection driver section 122E has multiple drivers DRV for amplifying signals from the control-line selection circuit 121E and for driving the corresponding control lines.

Each driver DRV in the control-line selection driver section 122E is connected to the corresponding control line (LRST or LTRG).

The drive-capability adjusting circuit 124 has a function for adjusting the drive capability of the control-line selection driver 122E.

When the shutter-mode switching signal SHRMODE is input to the drive-capability adjusting circuit 124 and the PDs are reset in the global shutter operation, the drive-capability adjusting circuit 124 reduces the drive capability of the control-line selection driver section 122E to reduce the amount of instantaneous current.

The drive-capability adjusting circuit 124 controls the drive capability of the control-line selection driver section 122E by using a drive-capability control signal TROFF and its inverted signal XTROFF.

Figure 23:
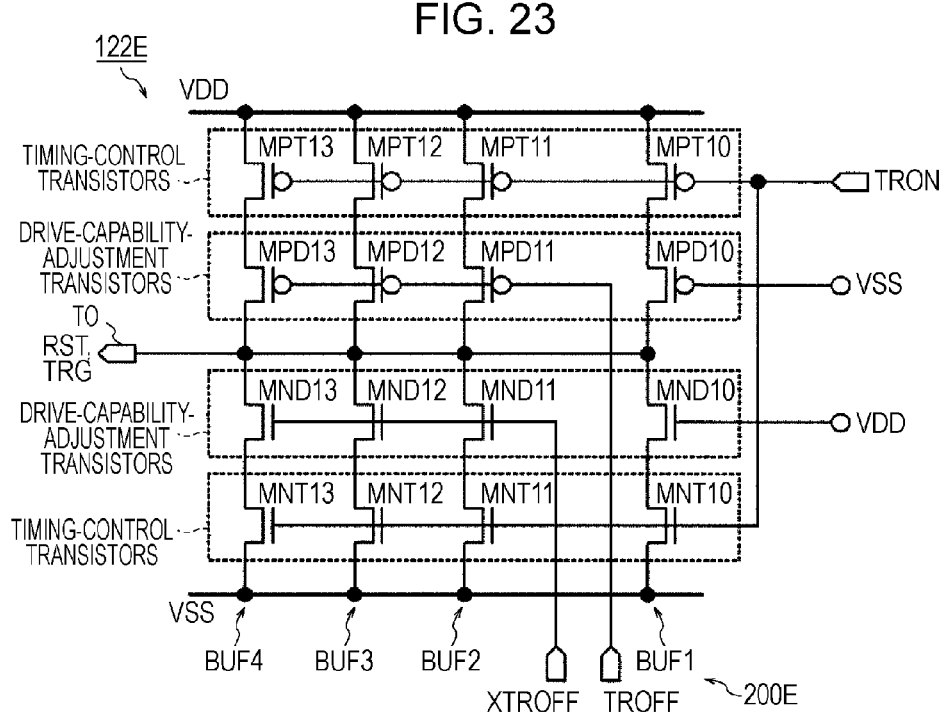
FIG. 23 is a circuit diagram showing an example of the configuration of a control-line selection driver section according to the fourth embodiment of the present invention.

FIG. 23 is a circuit diagram showing an example of the configuration of the control-line selection driver section 122E according to the fourth embodiment of the present invention.

The control-line selection driver section 122E shown in FIG. 23 has timing-control PMOS transistors MPT10 to MPT13, timing-control NMOS transistors MNT10 to MNT13, drive-capability-adjustment PMOS transistors MPD10 to MPD13, and drive-capability-adjustment NMOS transistors MND10 to MND13.

In the fourth embodiment, the transistors MPT10 to MPT13, the transistors MNT10 to MNT13, the transistors MPD10 to MPD13, the transistors MND10 to MND13, and the drive-capability adjusting circuit 124 constitute a shutter-mode corresponding section 200E.

A source of the timing-control PMOS transistor MPT10 is connected to the power-supply potential (the power-supply line) VDD, and a drain of the PMOS transistor MPT10 is connected to a source of the drive-capability-adjustment PMOS transistor MPD10.

A source of the timing-control NMOS transistor MNT10 is connected to the reference potential (the power-supply line) VSS, and a drain of the NMOS transistor MNT10 is connected to a source of the drive-capability-adjustment NMOS transistor MND10.

A drain of the drive-capability-adjustment PMOS transistor MPD10 is connected to a drain of the drive-capability-adjustment NMOS transistor MND10, and its interconnection point is connected to an output terminal TO connected to the control line.

A source of the timing-control PMOS transistor MPT11 is connected to the power-supply potential (the power-supply line) VDD, and a drain of the PMOS transistor MPT11 is connected to a source of the drive-capability-adjustment PMOS transistor MPD11.

A source of the timing-control NMOS transistor MNT11 is connected to the reference potential (the power-supply line) VSS, and a drain of the NMOS transistor MNT11 is connected to a source of the drive-capability-adjustment NMOS transistor MND11.

A drain of the drive-capability-adjustment PMOS transistor MPD11 is connected to a drain of the drive-capability-adjustment NMOS transistor MND11, and its interconnection point is connected to the output terminal TO connected to the control line.

A source of the timing-control PMOS transistor MPT12 is connected to the power-supply potential (the power-supply line) VDD, and a drain of the PMOS transistor MPT12 is connected to a source of the drive-capability-adjustment PMOS transistor MPD12.

A source of the timing-control NMOS transistor MNT12 is connected to the reference potential (the power-supply line) VSS, and a drain of the NMOS transistor MNT12 is connected to a source of the drive-capability-adjustment NMOS transistor MND12.

A drain of the drive-capability-adjustment PMOS transistor MPD12 is connected to a drain of the drive-capability-adjustment NMOS transistor MND12, and its interconnection point is connected to the output terminal TO connected to the control line.

A source of the timing-control PMOS transistor MPT13 is connected to the power-supply potential (the power-supply line) VDD, and a drain of the PMOS transistor MPT13 is connected to a source of the drive-capability-adjustment PMOS transistor MPD13.

A source of the timing-control NMOS transistor MNT13 is connected to the reference potential (the power-supply line) VSS, and a drain of the NMOS transistor MNT13 is connected to a source of the drive-capability-adjustment NMOS transistor MND13.

A drain of the drive-capability-adjustment PMOS transistor MPD13 is connected to a drain of the drive-capability-adjustment NMOS transistor MND13, and its interconnection point is connected to the output terminal TO connected to the control line.

As shown in FIG. 23, the control-line selection driver section 122E according to the fourth embodiment has a configuration in which multiple driver buffers BUF1 and BUF4, each including the PMOS transistors and the NMOS transistors connected in series, are arranged.

A timing control signal TRON controlled by the control-line selection circuit 121E is input to gates of the timing-control transistors MPT10 to MPT13 and MNT10 to MNT13.

The control signal TROFF output from the drive-capability adjusting circuit 124 is input to gates of the drive-capability-adjustment transistors MPD11 to MPD13 and the control signal XTROFF output from the drive-capability-adjusting circuit 124 is input to gates of the drive-capability-adjustment transistors MND11 to MND13.

The reference potential VSS is supplied to the gate of the drive-capability-adjustment transistor MPD10 and the power-supply potential VDD is supplied to the gates of the transistor MND10, so that the transistors MPD10 and MND10 are turned on.

In the rolling shutter operation and in the signal-reading operation, the control signal TROFF is set to the potential of the low level of VSS and the control signal XTROFF is set to the potential of the high level of VDD, so that all of the transistors MPD11 to MPD13 and MND11 to MND13 are turned on.

Thus, in the rolling shutter operation and in the signal-reading operation, the reset control lines LRST and the transfer control lines LTRG are driven through all transistors.

In contrast, during the reset of the PDs in the global shutter operation, the control signal TROFF is set to the potential of the high level of VDD and the control signal XTROFF is set to the potential of the low level of VSS, so that the transistors MPD11 to MPD13 and MND11 to MND13 are turned on.

Thus, during reset of the PDs in the global shutter operation, the reset control lines LRST and the transfer control lines LTRG are driven by only the driver buffer BUF1 including the transistors MPT10, MPD10, MNT10, and MND10.

As described above, according to the fourth embodiment, the drive capability of the control-line selection driver section can be reduced only in the global shutter operation.

Thus, in the rolling shutter operation and in the data-reading operation, the reset signal RST and the transfer signal TRG can be switched at a sufficient speed, and also the peak current during reset of the PDs in the global shutter operation can be reduced.

With the above-described configuration, it is also possible to reduce the amount of instantaneous current in the global shutter operation, to reduce a fluctuation in the potential of the power supply, and to prevent image-quality deterioration and device breakdown due to latchup.

Fifth Embodiment

Figure 24:
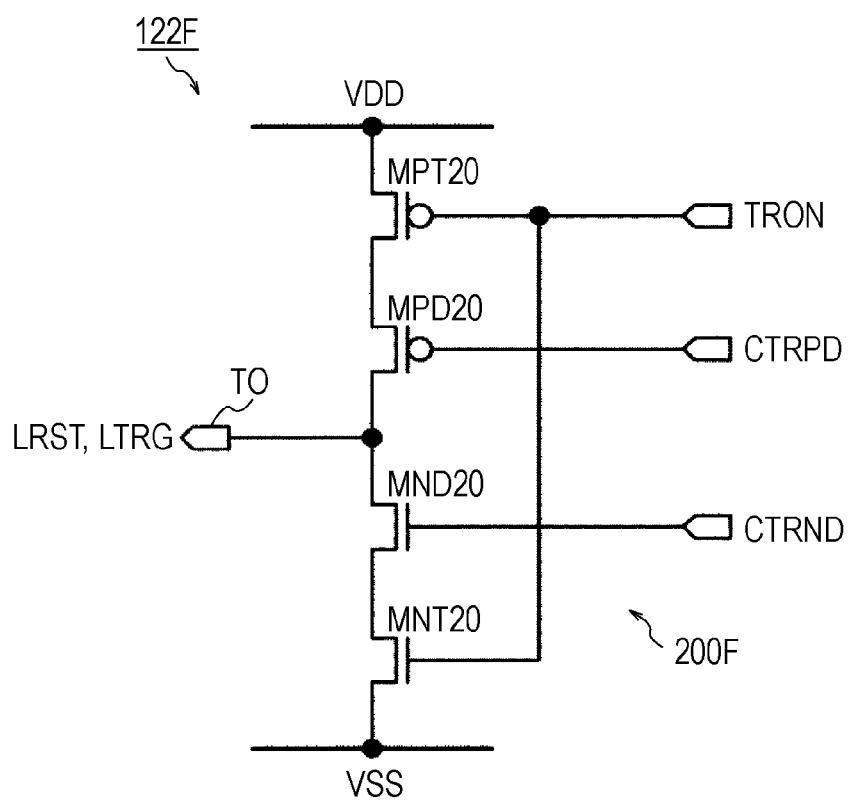
FIG. 24 is a circuit diagram showing an example of the configuration of a control-line selection driver section in a row selection circuit according to a fifth embodiment of the present invention.

FIG. 24 is a circuit diagram showing an example of the configuration of a control-line selection driver section in a row selection circuit according to a fifth embodiment of the present invention.

An overall configuration of a CMOS image sensor according to the fifth embodiment of the present invention can have the configuration shown in FIG. 3, as in the first embodiment of the present invention.

The row selection circuit according to the fifth embodiment can have the configuration shown in FIG. 22.

A control-line selection driver section 122F shown in FIG. 24 has a timing-control PMOS transistor MPT20, a timing-control NMOS transistor MNT20, a drive-capability-adjustment PMOS transistor MPD20, and a drive-capability-adjustment NMOS transistor MND20.

In the fourth embodiment, the transistors MPT20, the MNT20, the MPD20, the MND20, and the drive-capability adjusting circuit 124 constitute a shutter-mode corresponding section 200F.

A source of the timing-control PMOS transistor MPT20 is connected to the power-supply potential (the power-supply line) VDD, and a drain of the PMOS transistor MPT20 is connected to a source of the drive-capability-adjustment PMOS transistor MPD20.

A source of the timing-control NMOS transistor MNT20 is connected to the reference potential (the power-supply line) VSS, and a drain of the NMOS transistor MNT20 is connected to a source of the drive-capability-adjustment NMOS transistor MND20.

A drain of the drive-capability-adjustment PMOS transistor MPD20 is connected to a drain of the drive-capability-adjustment NMOS transistor MND20, and its interconnection point is connected to an output terminal TO connected to the control line.

A timing control signal TRON controlled by the control-line selection circuit 121E is input to gates of the power-supply-side transistors MPT20 and MNT20.

Control signals CTRPD and CTRND for adjusting the drive capability are supplied from the drive-capability adjusting circuit 124 to the gates of the output-side transistors MPD20 and MND20, respectively.

In the rolling shutter operation, the control signal CTRPD is set to the potential of the low level of VSS and the control signal CTRND is set to the potential of the high level of VDD.

At this point, a voltage Vgsp between the gate and the source of the transistor MPT20 and a voltage Vgsn between the gate and the source of the transistor MNT20 are expressed by equation (8) below and the resistances of the transistors MPT20 and MNT20 become low.

$$Vgsp = VSS\_VDD$$

$$Vgsn = VDD - VSS \tag{8}$$

In the rolling shutter operation, the control signals CTRPD and CTRND are set to satisfy:

$$VSS < CTRPD < VDD - |Vthp| \text{(where } Vthp \text{ indicates a threshold voltage for } MPD20\text{)}$$

$$VDD > CTRND < VSS + |Vthn| \text{(where } Vthn \text{ indicates a threshold voltage for } MND20\text{)} \tag{9}$$

With this arrangement, since the resistances of the transistors MPT20 and MNT20 become high, the peak current in the global shutter operation can be reduced.

For example, for $-Vthp = Vthn = (VDD-VSS)/4$, setting is performed to satisfy $CTRPD = CTPND = (VDD-VSS)/2$.

In general, since a MOSFET in a driver is operated as a switch, an enhancement MOSFET is used.

In the circuit configuration shown in FIG. 24, when an output of the driver is switched from the VDD level to the VSS level, there is a following feature.

That is, in the initial state, the control signal CTRPD and the reference potential VSS are supplied to the gate and the drain, respectively, of the transistor MPD20. Thus, since the transistor MPD20 operates in a saturation area, the instantaneous current is proportional to $(Vgsp-Vthn)^2$.

At this point, when the control signal CTRPD is at the VSS level, $Vgs-Vthn = (VDD-VSS) \cdot (3/4)$ is satisfied.

In contrast, when the control signal CTRPD is at the level of $(VDD-VSS)/2$, $Vgs-Vthn = (VDD-VSS) \cdot (1/4)$ is satisfied.

Thus, during reset of the PDs in the global shutter operation, the amount of instantaneous current can be reduced to about one ninth.

With the above-described configuration, it is also possible to reduce the amount of instantaneous current in the global shutter operation, to reduce a fluctuation in the potential of the power supply, and to prevent image-quality deterioration and device breakdown due to latchup.

As described above, according to the first to fifth embodiments, the drive capability of the control-line selection driver section is reduced only in the global shutter operation.

Thus, in the rolling shutter operation and in the data-reading operation, the reset signal RST and the transfer signal TRG can be switched at a sufficient speed, and also the peak current during reset of the PDs in the global shutter operation can be reduced.

As a result, it is possible to prevent image-quality deterioration and device breakup due to latchup.

According to the configuration of the second embodiment, it is also possible to reduce the area of the drivers and to reduce the cost.

The CMOS image sensor according to each embodiment is not particularly limited. For example, it can be configured as a CMOS image sensor having a column-parallel analog-to-digital converter (hereinafter abbreviated as an "ADC").

Figure 25:
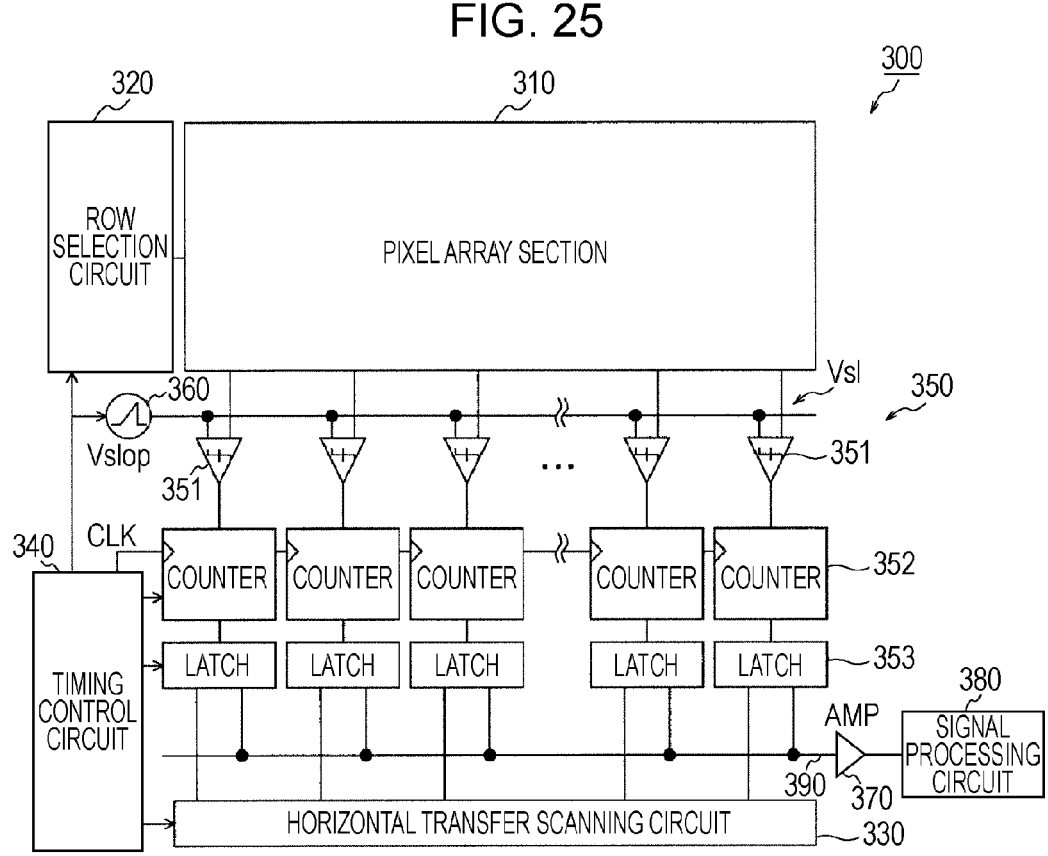
FIG. 25 is a block diagram showing an example of the configuration of a column-parallel-ADC-equipped solid-state image capture device (CMOS image sensor) according to the embodiment of the present invention.

FIG. 25 is a block diagram showing an example of the configuration of a column-parallel-ADC-equipped solid-state image capture device (CMOS image sensor) according to the present embodiment.

As shown in FIG. 25, this solid-state image capture device 300 has a pixel array section 310 serving as an image capture section, a row selection circuit 320 serving as a pixel drive section, a horizontal transfer scanning circuit 330, and a timing control circuit 340.

The solid-state image capture device 300 further has an ADC group 350, a digital-to-analog converter (hereinafter abbreviated as a "DAC") 360, sense amplifier circuits 370, and a signal processing circuit 380.

The pixel array section 310 has a configuration in which, for example, pixels (as shown in FIG. 4), each including a photodiode and an amplifier, are arranged in a matrix.

The row selection circuit 320, the horizontal transfer scanning circuit 330, and the timing control circuit 340, which are arranged in the solid-state image capture device 300, serve as control circuits for sequentially reading signals from the pixel array section 310. The timing control circuit 340 generates an internal clock, the row selection circuit 320 controls row addressing and row scanning, and the horizontal transfer scanning circuit 330 controls column addressing and column scanning.

The row selection circuit 320 may be implemented by the row selection circuit described above in connection with FIGS. 3 to 24.

The ADC group 350 includes ADCs in multiple columns, each ADC having a comparator 351, a counter 352, and a latch 353.

The comparator 351 compares a reference voltage Vslop having a ramp waveform with an analog signal obtained from pixels for each row line through a vertical signal line. The reference voltage Vslop is obtained by changing, in a step-wise manner, a reference voltage generated by the DAC 360.

The counter 352 counts the comparison time of the comparator 351.

The ADC group 350 has an n-bit digital signal conversion function and has column-parallel ADC blocks arranged for the respective vertical signal lines (column lines).

Outputs of the latches 353 are connected to horizontal transfer lines 390 having, for example, a 2n bit width.

In addition, 2n amplifier circuits 370 corresponding to the horizontal transfer lines 390 and the signal processing circuit 380 are arranged.

In the ADC group 350, the comparators 351 provided in respective columns compare analog signal (potentials vsl) read out to the vertical signal lines with the reference voltage Vslop (having a slope waveform that changes to a linear waveform with a certain gradient).

In this case, the counters 352 arranged in each row similarly to the comparators 351 operate. The potential Vslop having the ramp waveform and the counter values change in a one-to-one relationship, so that the potentials (analog signals) Vsl of the vertical signal lines are converted into a digital signal.

A change in the reference voltage Vslop is to convert a change in voltage into a change in time, and the time is counted in a certain period (clocks) to perform conversion into a digital value.

When the analog electrical signal Vsl and the reference voltage Vslop cross each other, the output of the comparator 351 is inverted and a clock input to the counter 352 is stopped to thereby completing the AD (analog-to-digital) conversion.

After the completion of the period of the AD conversion, the horizontal transfer scanning circuit 330 causes data held by the latches 353 to be input to the signal processing circuit 380 through the horizontal transfer lines 390 and the amplifier circuits 370, so that a two-dimensional image is generated.

The column-parallel output processing is performed as described above.

The solid-state image capture device having the above-described operation can be used as image-capture devices for digital cameras and video cameras.

Figure 26:
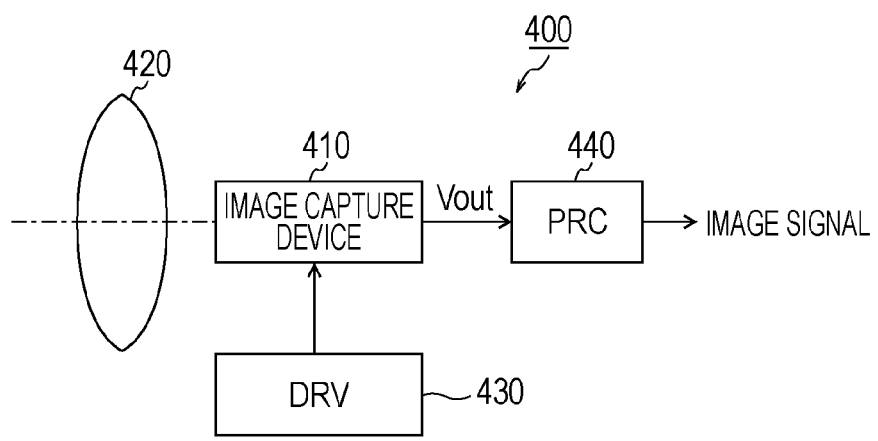
FIG. 26 is a diagram showing one example of the configuration of a camera system to which the solid-state image capture device according to the embodiment of the present invention is applied.

FIG. 26 is a diagram showing one example of the configuration of a camera system to which the solid-state image capture device according to the embodiment of the present invention is applied.

As shown in FIG. 26, this camera system 400 has an image capture device 410 to which the CMOS image sensor (the solid-state image capture device) 100 or 300 according to the embodiment of the present invention can be applied.

In addition, the camera system 400 has an optical system that guides incident light to a pixel area of the image capture device 410 to form an image of a subject. The optical system includes, for example, a lens 420 that forms an image of incident light (image light) on an image-capture surface.

The camera system 400 further has a driver circuit (DRV) 430 and a signal processing circuit (PRC) 440. The driver circuit 430 drives the image-capture device 410 and the signal processing circuit 440 processes a signal output from the image-capture device 410.

The drive circuit 430 has a timing generator (not shown) for generating various timing signals, including a start pulse and a clock pulse, for driving the circuitry in the image capture device 410, and drives the image-capture device 410 by using the timing signals.

The signal processing circuit 440 performs predetermined signal processing on the signal output from the image-capture device 410 to provide an image signal. For example, the image signal is recorded to a storage medium, such as a memory.

The image information recorded to the storage medium may be printed on paper by a printer or the like. The image signal obtained by the signal processing circuit 440 may also be displayed as a moving image on a monitor, such as a liquid-crystal display.

The use of the image capture device 100 or 300 as the image capture device 410 for an image capture apparatus, such as a digital still camera or the like, as described above, makes it possible to achieve a high-accuracy camera with low power consumption.

It should be understood by those skilled in the art that various modifications, combinations, sub-combinations and alterations may occur depending on design requirements and other factors insofar as they are within the scope of the appended claims or the equivalents thereof.

What is claimed is:

1. A solid-state image capture device comprising:
   a pixel section configured to generate an image signal in accordance with exposure time;
   a pixel drive section configured to perform a shutter operation of the pixel section and reading using a plurality of control lines; and
   a controlling section configured to control an operation of the pixel drive section in accordance with (i) a rolling shutter mode in which exposure is performed for each row, or (ii) a global shutter mode in which exposure is simultaneously performed, wherein,
the controlling section controls an impedance in accordance with either the rolling shutter mode or the global shutter mode, and
the controlling section includes an impedance element that, in a shutter-mode corresponding section, includes a resistor having a resistance value RREG expressed by RREG=RDRIVE/X(20≤X≤M/10), where RDRIVE indicates an on-resistance of the drivers and M indicates the number of control lines.

2. The solid-state image capture device according to claim 1, wherein the impedance element is connected between a power-supply terminal of the pixel drive section and at least one of power-supply lines of a power-supply potential and a reference potential.

3. The solid-state image capture device according to claim 2, wherein the pixel-drive section has:
a control-line selection circuit configured to select at least one row of the plurality of control lines,
a control signal configured to be output to the pixels in the selected at least one row of the plurality of control lines, and
a control-line selection driver section including drivers configured to (i) amplify a signal from the control-line selection circuit, and (ii) drive the control signal for the pixels to the corresponding control lines.

4. The solid-state image capture device according to claim 1, wherein:
the pixel-drive section has (a) a control-line selection circuit configured to select at least one of row of the plurality of control lines,
a control signal configured to be output to the pixels in the selected at least one row of the plurality of control lines, and (b) a control-line selection driver section including drivers configured to (i) amplify a signal from the control-line selection circuit, and (ii) drive the control signal for the pixels to the corresponding control lines; and
the shutter-mode corresponding section includes an impedance element connected between (i) a power-supply terminal of the control-line selection driver section, and (ii) at least one of power-supply lines of a power-supply potential and a reference potential.

5. The solid-state image capture device according to claim 4, wherein the impedance element in the shutter-mode corresponding section includes a resistor having a resistance value RREG expressed by RREG=RDRIVE/X(20≤X≤M/10), where RDRIVE indicates an on-resistance of the drivers and M indicates the number of control lines.

6. The solid-state image capture device according to claim 1, wherein:
the pixel-drive section has (a) a control-line selection circuit configured to select at least one row of the control lines, (b) a control signal configured to be output to the pixels in the selected at least one row of the control lines, and (c) a control-line selection driver section including drivers configured to (i) amplify a signal from the control-line selection circuit, and (ii) drive the control signal for the pixels to the corresponding control lines: and
the shutter-mode corresponding section includes a selection-range switching section configured to (i) select at least one of the drivers in the control-line selection driver section when exposure is performed in the rolling shutter system, and (ii) select all of the drivers in the control-line selection driver section when exposure is performed in the global shutter system.

7. The solid-state image capture device according to claim 6, wherein the drivers arranged in different ones of the ranges selected by the selection-range switching section share a part in the control-line selection driver section.

8. The solid-state image capture device according to claim 6, wherein, when exposure is performed in the rolling shutter system, the pixel drive section selects, at different timings, the drivers arranged in different ones of the selection ranges selected by the selection-range switching circuit.

9. The solid-state image capture device according to claim 1, wherein:
the pixel drive section has (a) control-line selection circuit configured to select at least one row of the control lines, (b) a control signal configured to be output to the pixels in the selected at least one row of the control lines, and (c) a control-line selection driver section including drivers configured to (i) amplify a signal from the control-line selection circuit, and (ii) drive the control signal for the pixels to the corresponding control lines: and
the shutter-mode corresponding section includes a drive-capability adjusting section configured to switch between (i) drive capability of the drivers when exposure is performed in the global shutter system, and (ii) drive capability of the drivers when exposure is performed in the rolling shutter system.

10. The solid-state image capture device according to claim 9, wherein the drive-capability adjusting section adjusts the drive capability of the drivers when exposure is performed in the global shutter system to be smaller than the drive capability of the drivers when exposure is performed in the rolling shutter system.

11. The solid-state image capture device according to claim 10, wherein:
the control-line selection driver section has driver buffers connected in parallel between a power-supply line and an output terminal connected to the control line;
each driver buffer includes a drive-capability-adjustment transistor connected between the power-supply line and the output terminal; and
the drive-capability adjusting circuit is configured to control the number of operable driver buffers by controlling turning-on and turning-off of the drive-capability-adjustment transistors of the driver buffers.

12. The solid-state image capture device according to claim 10, wherein:
the control-line selection driver section has a driver buffer connected in parallel between a power supply line and an output terminal connected to the control line;
the driver buffer includes a drive-capability-adjustment transistor connected between the power-supply line and the output terminal; and
the drive-capability adjusting circuit is configured to control current flowing through the driver buffer by changing a signal level of the control terminal of the drive-capability-adjustment transistor of the driver buffer.

13. The solid-state image capture device according to claim 1, wherein the pixel has:
an output node;
a photoelectric conversion element configured to convert the optical signal into the electrical signal and store charge of the electrical signal;
a transfer element that is turned on or turned off in accordance with a transfer signal and that is configured to transfer the charge in the photoelectric conversion element to the output node when the transfer signal is turned on; and
a reset element that is turned on or turned off in accordance with a reset signal and that is configured to reset the output node when the reset element is turned on.

14. The solid-state image capture device according to claim 1, further comprising:
- a reading circuit configured to read pixel signals for multiple pixels from the pixel array section;
- comparators (i) arranged so as to correspond to columns of the pixels, and (ii) configured to perform determination by comparing potentials of the read pixel signals with a reference voltage and output signals of the determination; and
- counters configured to be controlled by the output signals of the determination to count comparison times of the corresponding comparators.

* * * * *